United States Patent
Xu et al.

(10) Patent No.: US 11,818,707 B2
(45) Date of Patent: Nov. 14, 2023

(54) METHODS AND DEVICES FOR PERFORMING UPLINK COMMUNICATION IN INDUSTRIAL COMMUNICATION

(71) Applicant: Huawei Technologies Co., Ltd., Shenzhen (CN)

(72) Inventors: Xiaoying Xu, Shanghai (CN); Qufang Huang, Shenzhen (CN); Chong Lou, Shanghai (CN); Qinghai Zeng, Shanghai (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 17/351,435

(22) Filed: Jun. 18, 2021

(65) Prior Publication Data

US 2021/0314977 A1    Oct. 7, 2021

Related U.S. Application Data

(63) Continuation of application No. PCT/CN2019/125553, filed on Dec. 16, 2019.

(30) Foreign Application Priority Data

Dec. 20, 2018    (CN) .......................... 201811561998.7

(51) Int. Cl.
*H04W 72/12* (2023.01)
*H04W 72/1263* (2023.01)
(Continued)

(52) U.S. Cl.
CPC ... *H04W 72/1263* (2013.01); *H04W 28/0268* (2013.01); *H04W 28/24* (2013.01); *H04W 72/542* (2023.01); *H04W 80/02* (2013.01)

(58) Field of Classification Search
CPC ........... H04W 72/1263; H04W 72/542; H04W 28/0268; H04W 28/24; H04W 80/02
See application file for complete search history.

(56) References Cited

U.S. PATENT DOCUMENTS

2010/0118741 A1    5/2010    Youn et al.
2016/0315741 A1*  10/2016    Tsai ..................... H04L 5/0058
(Continued)

FOREIGN PATENT DOCUMENTS

CN    102223720 A    10/2011
CN    102695202 A    9/2012
(Continued)

OTHER PUBLICATIONS

Ericsson, "Scheduling enhancements for TSN traffic patterns", 3GPP TSG-RAN WG2 #103bis, Tdoc R2-1814815, Chengdu, China, Oct. 8-12, 2018, 2 pages.
(Continued)

*Primary Examiner* — Mewale A Ambaye
(74) *Attorney, Agent, or Firm* — Slater Matsil, LLP

(57) ABSTRACT

Embodiments of this application provide a communication method, apparatus, a terminal, a network device, and a storage medium. After the terminal receives, from the network device, indication information used to indicate the terminal to report traffic pattern information of a first logical channel, a first PDU session, a first application, a first radio bearer, or a first QoS flow, the terminal reports the traffic pattern information of the first logical channel, the first PDU session, the first application, the first radio bearer, or the first QoS flow based on the indication information. In this manner, the terminal reports, based on the indication, the traffic pattern information of only the logical channel, the PDU session, the service, the radio bearer, or the QoS flow that is indicated by the network device.

20 Claims, 8 Drawing Sheets

(51) Int. Cl.
    *H04W 28/02* (2009.01)
    *H04W 28/24* (2009.01)
    *H04W 80/02* (2009.01)
    *H04W 72/542* (2023.01)

(56) References Cited

U.S. PATENT DOCUMENTS

| | | | |
|---|---|---|---|
| 2017/0063503 A1* | 3/2017 | Liu | H04L 5/0048 |
| 2017/0230956 A1 | 8/2017 | Kim et al. | |
| 2018/0192426 A1* | 7/2018 | Ryoo | H04W 74/0833 |

FOREIGN PATENT DOCUMENTS

| | | |
|---|---|---|
| CN | 103687034 A | 3/2014 |
| CN | 106550457 A | 3/2017 |
| CN | 107889147 A | 4/2018 |
| CN | 108886781 A | 11/2018 |
| CN | 108923894 A | 11/2018 |
| EP | 3291620 A1 | 3/2018 |
| WO | 2017148231 A1 | 9/2017 |
| WO | 2018070436 A1 | 4/2018 |

OTHER PUBLICATIONS

Intel Corporation, "Scheduling enhancements for TSN traffic", 3GPP TSG-RAN WG2 Meeting #104, R2-1818236, Spokane, WA, US, Nov. 12-16, 2018, 3 pages.
ETSI TS 123 502, 5G; Procedures for the 5G System, 3GPP TS 23.502 version, Sep. 2018, 329 Pages, v15.3.0.
Motorola Mobility et al., KI#13: Update to Solution 28 "SMF assisted NG-RAN information", SA WG2 Meeting #129bis, S2-1812731, Nov. 25-30, 2018, 7 Pages, West Palm Beach, FL, USA.
Motorola Mobility et al., "SMF assisted RAN information", SA WG2 Meeting #127, S2-183510, Apr. 16-20, 2018, 7 pages, Sanya, P.R. of China.
Huawei et al., "Study sidelink resource allocation mechanism", 3GPP TSG-RAN WG2 # 103bis, R2-1815199, Chengdu, China, Oct. 8-12, 2018, 4 pages.
Ericsson, "Additional TSN traffic pattern for RAN optimization", 3GPP TSG-SA WG2 Meeting #130, S2-1901234, Kochi, India ,Jan. 21-25, 2019, 6 pages.
3GPP TS 23.501 V15.4.0 (Dec. 2018), 3rd Generation Partnership Project; Technical Specification Group Services and System Aspects; System Architecture for the 5G System; Stage 2 (Release 15), 236 pages.
Alcatel, "Scheduling Information Report for E-UTRAN", 3GPP TSG RAN WG2 #55, R2-062963, Seoul, Korea, Oct. 9-13, 2006, 4 pages.
Lenovo, "SMF assisted RAN information, Motorola Mobility", SA WG2 Meeting #127, S2-183510, Apr. 16-20, 2018, Sanya, P.R. China, 5 pages.
3GPP TS 38.413 V15.1.0 (Sep. 2018), 3rd Generation Partnership Project; Technical Specification Group Radio Access Network; NG-RAN; NG Application Protocol (NGAP) (Release 15), 295 pages.
Oppo, "Scheduling enhancements for TSN network", 3GPP TSG-RAN WG2 #104, R2-1817248, Spokane, WA, US, Nov. 12-16, 2018, 5 pages.
3GPP TS 38.473 V15.3.0 (Sep. 2018), 3rd Generation Partnership Project; Technical Specification Group Radio Access Network; NG-RAN; F1 application protocol (F1AP) (Release 15), 276 pages.
3GPP TR 22.804 V16.1.0 (Sep. 2018), 3rd Generation Partnership Project; Technical Specification Group Services and System Aspects; Study on Communication for Automation in Vertical Domains (Release 16), 189 pages.
Qualcomm Inc., "eURLLC Considerations for Factory Automation", 3GPP TSG-RAN WG1 Meeting #94bis, R1-1811275, Oct. 8-12, 2018, 2 pages.

* cited by examiner

METHODS AND DEVICES FOR PERFORMING UPLINK COMMUNICATION IN INDUSTRIAL COMMUNICATION

CROSS-REFERENCE TO RELATED APPLICATIONS

This application is a continuation of International Application No. PCT/CN2019/125553, filed on Dec. 16, 2019, which claims priority to Chinese Patent Application No. 201811561998.7, filed on Dec. 20, 2018. The disclosures of the aforementioned applications are hereby incorporated by reference in their entireties.

TECHNICAL FIELD

This application relates to communications technologies, and in particular, to a communication method and apparatus, a terminal, a network device, and a storage medium.

BACKGROUND

In a mobile communications network, before a terminal performs an uplink service, a network device performs service scheduling for the terminal. Modes of the service scheduling include dynamic scheduling and configured scheduling. In the dynamic scheduling mode, the terminal dynamically requests a resource from the network device each time before performing an uplink service. The network device dynamically allocates an uplink resource to the terminal based on the request of the terminal. Then, the terminal transmits uplink data on the dynamically allocated uplink resource. In the configured scheduling mode, the network device may configure a periodic uplink resource for the terminal, and the terminal directly transmits an uplink service on the periodic uplink resource.

Industrial communication is an important scenario of mobile communication. In the industrial communication scenario, a mobile communications network may be used for industrial control. An industrial control process is characterized by a relatively fixed service transmission periodicity, a stable size of uplink service content, and a same traffic pattern shared by a plurality of devices. In addition, high transmission reliability, a low latency, and low jitter are required in the industrial control process.

Therefore, how to perform an uplink service in the industrial communication scenario to adapt to the characteristics of the industrial communication scenario and meet the requirements of the industrial communication scenario is an urgent problem to be resolved.

SUMMARY

In view of this, embodiments of this application provide a communication method and apparatus, a terminal, a network device, and a storage medium, to adapt to characteristics of an industrial communication scenario and meet requirements of the industrial communication scenario when an uplink service is performed in the industrial communication scenario.

According to a first aspect, a communication method is provided, and includes:

A terminal receives indication information from a network device, where the indication information is used to indicate the terminal to report traffic pattern information of a first logical channel, a first PDU session, a first application, a first radio bearer, or a first QoS flow. After receiving the indication information, the terminal reports the traffic pattern information of the first logical channel, the first PDU session, the first application, the first radio bearer, or the first QoS flow based on the indication information.

According to a second aspect, a communication apparatus is provided, and includes a unit or means configured to perform each step according to the first aspect.

According to a third aspect, a communication apparatus is provided, and includes at least one processor and memory. The at least one processor is configured to perform the method according to the first aspect.

According to a fourth aspect, a communication apparatus is provided, and includes at least one processor and interface circuit. The processor is configured to communicate with a network device through the interface circuit, and perform the method according to the first aspect.

According to a fifth aspect, a program is provided. The program is used to perform the method according to the first aspect when being executed by a processor.

According to a sixth aspect, a program product such as a computer-readable storage medium is provided, and includes the program according to the fifth aspect.

According to a seventh aspect, a communication apparatus is provided. The communication apparatus is connected to a memory, and is configured to read and execute a program stored in the memory, to implement the method according to the first aspect. The communication apparatus may include a unit, module, or circuit configured to perform the method according to the first aspect. The communication apparatus may be a terminal, or may be a module used in a terminal, for example, a chip used in the terminal.

According to an eighth aspect, a terminal is provided, and includes the apparatus according to the second aspect.

It can be learned that in the foregoing aspects, the network device indicates, to the terminal, a logical channel, a PDU session, a service, a radio bearer, or a QoS flow whose traffic pattern information is to be reported, and the terminal reports, based on the indication, the traffic pattern information of only the logical channel, the PDU session, the service, the radio bearer, or the QoS flow that is indicated by the network device. In this way, reporting of the traffic pattern information is controlled by the network device, to reduce reporting overheads.

In the foregoing aspects, the terminal further receives configuration information from the network device, where the configuration information is used to indicate a configured resource allocated by the network device to the terminal based on the traffic pattern information.

In the foregoing aspects, the terminal further obtains the configured resource from the network device, and receives first scheduling information from the network device, where the first scheduling information is used to adjust the obtained configured resource.

In this implementation, the first scheduling information is scrambled by using a group identifier, and is used to adjust time domain position information of the configured resource.

It can be learned that in the foregoing aspects, the network device allocates one group identifier to terminals of a same type. When needing to adjust resources for a plurality of terminals of the same type, the network device scrambles, by using the group identifier, scheduling information used to adjust configured resources of the terminals, and all the terminals belonging to a group corresponding to the group identifier can receive the scheduling information. In this way, the scheduling information for the plurality of terminals of the same type is indicated by using one instruction, to reduce overheads. In addition, a latency caused by a change of a traffic pattern may also be reduced by using the scheduling information.

In the foregoing aspects, the terminal further receives second scheduling information from the network device, where the second scheduling information is used to indicate information about the configured resource. The terminal determines a resource of the terminal based on a corresponding resource offset and the information that is about the configured resource and that is indicated by using the second scheduling information.

In this implementation, the resource offset corresponding to the terminal is indicated by the network device in advance. The second scheduling information is scrambled by using a group identifier, and the terminal is in a device group identified by the group identifier.

It can be learned that in the foregoing aspects, the network device allocates one group identifier to devices of a same type, and terminals in a group identified by the group identifier each have a resource offset. When needing to allocate CG resources to a plurality of terminals of the same type, the network device scrambles, by using the group identifier, scheduling information used to indicate the configured resources of the terminals, and all the terminals belonging to the group corresponding to the group identifier can receive the scheduling information. A resource allocated to each terminal can be determined by using the resource offset of the terminal and information that is about the resources and that is indicated by using the scheduling information. In this way, the scheduling information for the plurality of terminals of the same type is indicated by using one instruction, to reduce overheads.

According to a ninth aspect, a communication method is provided, and includes:

After obtaining a first resource, a terminal receives indication information, where the indication information is used to indicate that the first resource is used to send a MAC CE. The terminal sends the MAC CE on the first resource based on the indication information.

According to a tenth aspect, a communication apparatus is provided, and includes a unit or means configured to perform each step according to the ninth aspect.

According to an eleventh aspect, a communication apparatus is provided, and includes at least one processor and memory. The at least one processor is configured to perform the method according to the ninth aspect.

According to a twelfth aspect, a communication apparatus is provided, and includes at least one processor and interface circuit. The processor is configured to communicate with a network device through the interface circuit, and perform the method according to the ninth aspect.

According to a thirteenth aspect, a program is provided. The program is used to perform the method according to the ninth aspect when being executed by a processor.

According to a fourteenth aspect, a program product such as a computer-readable storage medium is provided, and includes the program according to the thirteenth aspect.

According to a fifteenth aspect, a communication apparatus is provided. The communication apparatus is connected to a memory, and is configured to read and execute a program stored in the memory, to implement the method according to the ninth aspect. The communication apparatus may include a unit, module, or circuit configured to perform the method according to the ninth aspect. The communication apparatus may be a terminal, or may be a module used in a terminal, for example, a chip used in the terminal.

According to a sixteenth aspect, a terminal is provided, and includes the apparatus according to the tenth aspect.

It can be learned that in the foregoing aspects, a dedicated resource specially used to send the MAC CE such as a BSR is allocated to the terminal, so that sending of the BSR does not affect sending of periodic service data. This reduces a latency that occurs for a periodic service.

In the foregoing aspects, the MAC CE may include the BSR. Correspondingly, the indication information is used to indicate that the first resource is used to send the BSR.

In the foregoing aspects, the first resource is a periodic transmission resource.

In the foregoing aspects, the terminal sends, on the first resource, a MAC CE corresponding to a first logical channel or a first logical channel group.

In the foregoing aspects, the first logical channel or the first logical channel group is indicated by the network device in advance.

In the foregoing aspects, the indication information is further used to indicate the first logical channel or the first logical channel group.

In the foregoing aspects, the first logical channel is a logical channel whose priority is greater than or equal to a preset threshold, and the first logical channel group is a logical channel group whose priority is greater than or equal to a preset threshold.

In the foregoing aspects, when a data buffer size of the first logical channel or the first logical channel group is greater than 0, the terminal sends the BSR on the first resource.

According to a seventeenth aspect, a communication method is provided, and includes:

A network device sends indication information to a terminal, where the indication information is used to indicate the terminal to report traffic pattern information of a first logical channel, a first PDU session, a first application, a first radio bearer, or a first QoS flow. Then, the network device receives the traffic pattern information that is reported by the terminal based on the indication information and that is of the first logical channel, the first PDU session, the first application, the first radio bearer, or the first QoS flow.

According to an eighteenth aspect, a communication apparatus is provided, and includes a unit or means configured to perform each step according to the seventeenth aspect.

According to a nineteenth aspect, a communication apparatus is provided, and includes at least one processor and memory. The at least one processor is configured to perform the method according to the seventeenth aspect.

According to a twentieth aspect, a communication apparatus is provided, and includes at least one processor and interface circuit. The processor is configured to communicate with a terminal through the interface circuit, and perform the method according to the seventeenth aspect.

According to a twenty-first aspect, a program is provided. The program is used to perform the method according to the seventeenth aspect when being executed by a processor.

According to a twenty-second aspect, a program product such as a computer-readable storage medium is provided, and includes the program according to the twenty-first aspect.

According to a twenty-third aspect, a communication apparatus is provided. The communication apparatus is connected to a memory, and is configured to read and execute a program stored in the memory, to implement the method according to the seventeenth aspect. The communication apparatus may include a unit, module, or circuit configured to perform the method according to the seventeenth aspect. The communication apparatus may be a network device, or may be a module used in a network device, for example, a chip used in the network device.

According to a twenty-fourth aspect, a terminal is provided, and includes the apparatus according to the eighteenth aspect.

In the foregoing aspects, the network device further configures a resource for the terminal based on the traffic pattern information reported by the terminal, and sends configuration information to the terminal, where the configuration information is used to indicate the resource configured by the network device for the terminal.

In the foregoing aspects, the network device further sends first scheduling information to the terminal, where the first scheduling information is used to adjust the configured resource obtained by the terminal from the network device.

In this implementation, the first scheduling information is scrambled by using a group identifier. The first scheduling information is used to adjust time domain position information of the configured resource.

In the foregoing aspects, the network device further sends second scheduling information to the terminal, where the second scheduling information is used to indicate information about the configured resource, and the information about the configured resource is used by the terminal to determine a resource of the terminal based on a corresponding resource offset.

In this implementation, the resource offset corresponding to the terminal is indicated by the network device in advance. The second scheduling information is scrambled by using a group identifier, and the terminal is in a device group identified by the group identifier.

For beneficial effects of the foregoing aspects, refer to the beneficial effects of the first aspect to the eighth aspect. Details are not described herein again.

According to a twenty-fifth aspect, a communication method is provided, and includes:

A network device sends indication information to a terminal, where the indication information is used to indicate that a first resource is used to send a MAC CE. After sending the indication information, the network device receives the MAC CE sent by the terminal on the first resource.

According to a twenty-sixth aspect, a communication apparatus is provided, and includes a unit or means configured to perform each step according to the twenty-fifth aspect.

According to a twenty-seventh aspect, a communication apparatus is provided, and includes at least one processor and memory. The at least one processor is configured to perform the method according to the twenty-fifth aspect.

According to a twenty-eighth aspect, a communication apparatus is provided, and includes at least one processor and interface circuit. The processor is configured to communicate with a terminal through the interface circuit, and perform the method according to the twenty-fifth aspect.

According to a twenty-ninth aspect, a program is provided. The program is used to perform the method according to the twenty-fifth aspect when being executed by a processor.

According to a thirtieth aspect, a program product such as a computer-readable storage medium is provided, and includes the program according to the twenty-ninth aspect.

According to a thirty-first aspect, a communication apparatus is provided. The communication apparatus is connected to a memory, and is configured to read and execute a program stored in the memory, to implement the method according to the twenty-fifth aspect. The communication apparatus may include a unit, module, or circuit configured to perform the method according to the twenty-fifth aspect. The communication apparatus may be a network device, or may be a module used in a network device, for example, a chip used in the network device.

According to a thirty-second aspect, a network device is provided, and includes the apparatus according to the twenty-sixth aspect.

In the foregoing aspects, the MAC CE includes a BSR. Correspondingly, the indication information is used to indicate that the first resource is used to send the BSR.

In the foregoing aspects, the first resource is a periodic transmission resource.

In the foregoing aspects, the network device receives a MAC CE that is sent by the terminal on the first resource and that corresponds to a first logical channel or a first logical channel group.

In this implementation, the first logical channel or the first logical channel group is indicated by the network device in advance.

In the foregoing aspects, the indication information is further used to indicate the first logical channel or the first logical channel group.

In the foregoing aspects, the first logical channel is a logical channel whose priority is greater than or equal to a preset threshold, and the first logical channel group is a logical channel group whose priority is greater than or equal to a preset threshold.

In the foregoing aspects, when a data buffer size of the first logical channel or the first logical channel group is greater than 0, the network device receives the BSR sent by the terminal on the first resource.

For beneficial effects of the foregoing aspects, refer to the beneficial effects of the ninth aspect to the sixteenth aspect. Details are not described herein again.

DETAILED DESCRIPTION OF ILLUSTRATIVE EMBODIMENTS

First, some terms used in this application are described.

(1) A terminal is also referred to as user equipment (UE), a mobile station (MS), a mobile terminal (MT), or the like, and is a device that provides voice/data connectivity for a user, for example, a handheld device or a vehicle-mounted device with a wireless connection function. Currently, for example, the terminal is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

(2) A network device is a device in a wireless network, for example, a radio access network (RAN) node that enables a terminal to access the wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), or a wireless fidelity (Wi-Fi) access point (AP). In a network structure, the network device may include a centralized unit (CU) node or a distributed unit (DU) node, or may be a RAN device including a CU node and a DU node.

(3) The term "a plurality of" indicates two or more, and another quantifier is similar to the term.

Figure 1:
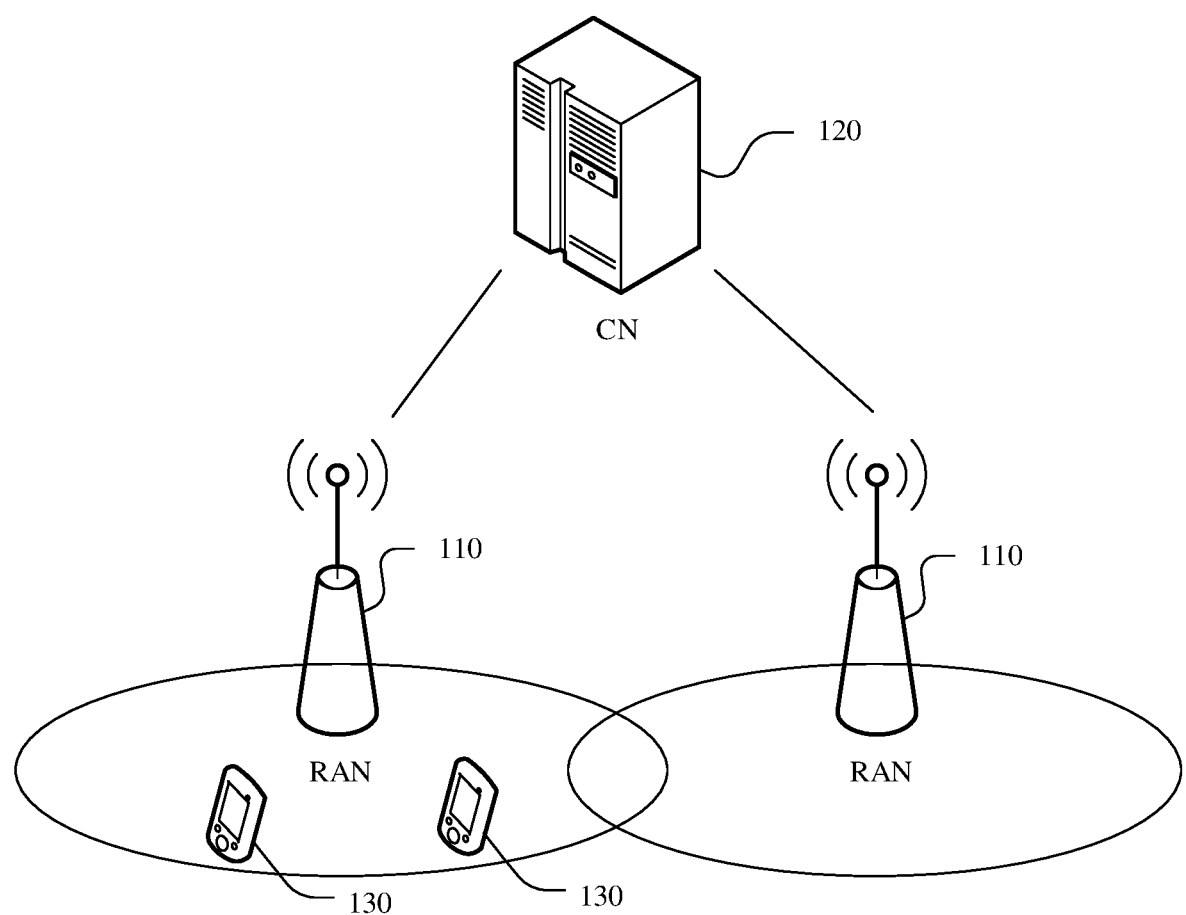
FIG. 1 is a schematic architectural diagram of a system according to this application.

FIG. 1 is a schematic architectural diagram of a system according to this application. As shown in FIG. 1, a terminal 130 accesses a wireless network, to obtain a service of an external network (for example, the Internet) through the wireless network, or communicate with another terminal through the wireless network. The wireless network includes a RAN 110 and a core network (CN) 120. The RAN 110 is used to enable the terminal 130 to access the wireless network, and the CN 120 is used to manage the terminal and provide a gateway for communicating with the external network. In this application, the terminal 130 may be a wireless terminal in an industrial communication field, for example, a terminal installed in a production workshop of a factory. There may be a plurality of terminals 130. All the plurality of terminals 130 may be of a same type, or some of the terminals may be of a same type. Terminals of a same type are consistent in terms of a service transmission periodicity, uplink service content, and a traffic pattern. For example, a plurality of terminals 130 of the same type may send uplink messages to the RAN 110 at a same moment.

In an industrial communication scenario, an industrial control process is characterized by a relatively fixed service transmission periodicity, a stable size of uplink service content, and a same traffic pattern shared by a plurality of devices. In addition, high transmission reliability, a low latency, and low jitter are required in the industrial control process. In an example of the scenario, a plurality of terminals are installed in a production workshop of a factory, traffic patterns of these devices are the same, and moments of sending messages by these devices to a network device are also the same. In a possible design, these devices separately interact with the network device. This processing manner may have the following three problems:

First problem: The terminals need to report all traffic pattern information to the network device, causing relatively high overheads.

Second problem: If a traffic pattern of terminals of a same type changes, the network device may need to adjust configured grant (CG) resources of the terminals. For example, if a start time of a service changes, the network device needs to adjust the resource for each terminal, causing relatively high overheads. In addition, a latency is increased due to the change of the traffic pattern.

Third problem: The network device needs to deliver an activation instruction to each terminal to activate the CG resources of the terminals. For the network device, instruction overheads required for indicating to activate the CG resources of the terminals are relatively high. For example, a physical downlink control channel (PDCCH) instruction used to activate the CG resource needs to be sent to each terminal. In addition, when performing resource scheduling for the terminals of the same type, the network device needs to separately perform resource scheduling for the terminals, causing relatively high overheads.

For the first problem, in this application, the network device indicates, to the terminal, a logical channel, a protocol data unit (PDU) session, a service, a radio bearer, or a quality of service (QoS) flow whose traffic pattern information is to be reported, and the terminal reports, based on the indication, the traffic pattern information of only the logical channel, the PDU session, the service, the radio bearer, or the QoS flow that is indicated by the network device. In this way, reporting of the traffic pattern information is controlled by the network device, to reduce reporting overheads.

For the second problem, in this application, the network device allocates one group identifier to the terminals of the same type. When needing to adjust resources for a plurality of terminals of the same type, the network device scrambles, by using the group identifier, scheduling information used to adjust configured resources of the terminals, and all the terminals belonging to a group corresponding to the group identifier can receive the scheduling information. In this way, the scheduling information for the plurality of terminals of the same type is indicated by using one instruction, to reduce overheads. In addition, the latency caused by the change of the traffic pattern may also be reduced by using the scheduling information.

For the third problem, in this application, the network device allocates one group identifier to the devices of the same type, and the terminals in a group identified by the group identifier each have a resource offset. When needing to allocate CG resources to a plurality of terminals of the same type, the network device scrambles, by using the group identifier, scheduling information used to indicate the configured resources of the terminals, and all the terminals belonging to the group corresponding to the group identifier can receive the scheduling information. A resource allocated to each terminal can be determined by using the resource offset of the terminal and information that is about the resources and that is indicated by using the scheduling information. In this way, the scheduling information for the plurality of terminals of the same type is indicated by using one instruction, to reduce overheads.

To distinguish between the scheduling information used to resolve the second problem and the scheduling information used to resolve the third problem, the scheduling information is respectively referred to as first scheduling information and second scheduling information below. However, the terms "first" and "second" herein are not used for limitation.

In addition, resource scheduling modes in a wireless communications network may generally include dynamic scheduling and configured grant-based scheduling. In the dynamic scheduling, a terminal requests a resource from a network device before each uplink data transmission, resulting in a relatively high latency. Therefore, a relatively high latency is caused when the dynamic scheduling is applied to an industrial communication scenario. The configured grant-based scheduling mode can reduce a latency, and therefore is more applicable to the industrial communication scenario. However, when the configured grant-based scheduling mode is applied to an industrial control process, the following fourth problem may occur:

In the configured grant-based scheduling mode, a periodic resource is configured based on a data size and a periodicity of a periodic service. However, in the industrial communication scenario, there may be aperiodic data with a deterministic transmission performance requirement. When the periodic service and an aperiodic service simultaneously arrive, if sending of a buffer status report (BSR) is triggered but a preconfigured resource cannot be used to send all data and the BSR, only the BSR can be sent first, and sending of periodic service data is delayed. Consequently, a latency of the periodic service is increased.

For the fourth problem, in this application, a dedicated resource specially used to send a MAC control element (MAC CE) such as the BSR is allocated to the terminal, so that sending of the BSR does not affect sending of the periodic service data. This reduces a latency that occurs for the periodic service.

Technical solutions of this application are separately described in the following embodiments of this application from perspectives of the foregoing four problems.

The following describes a technical solution for the first problem.

Figure 2:
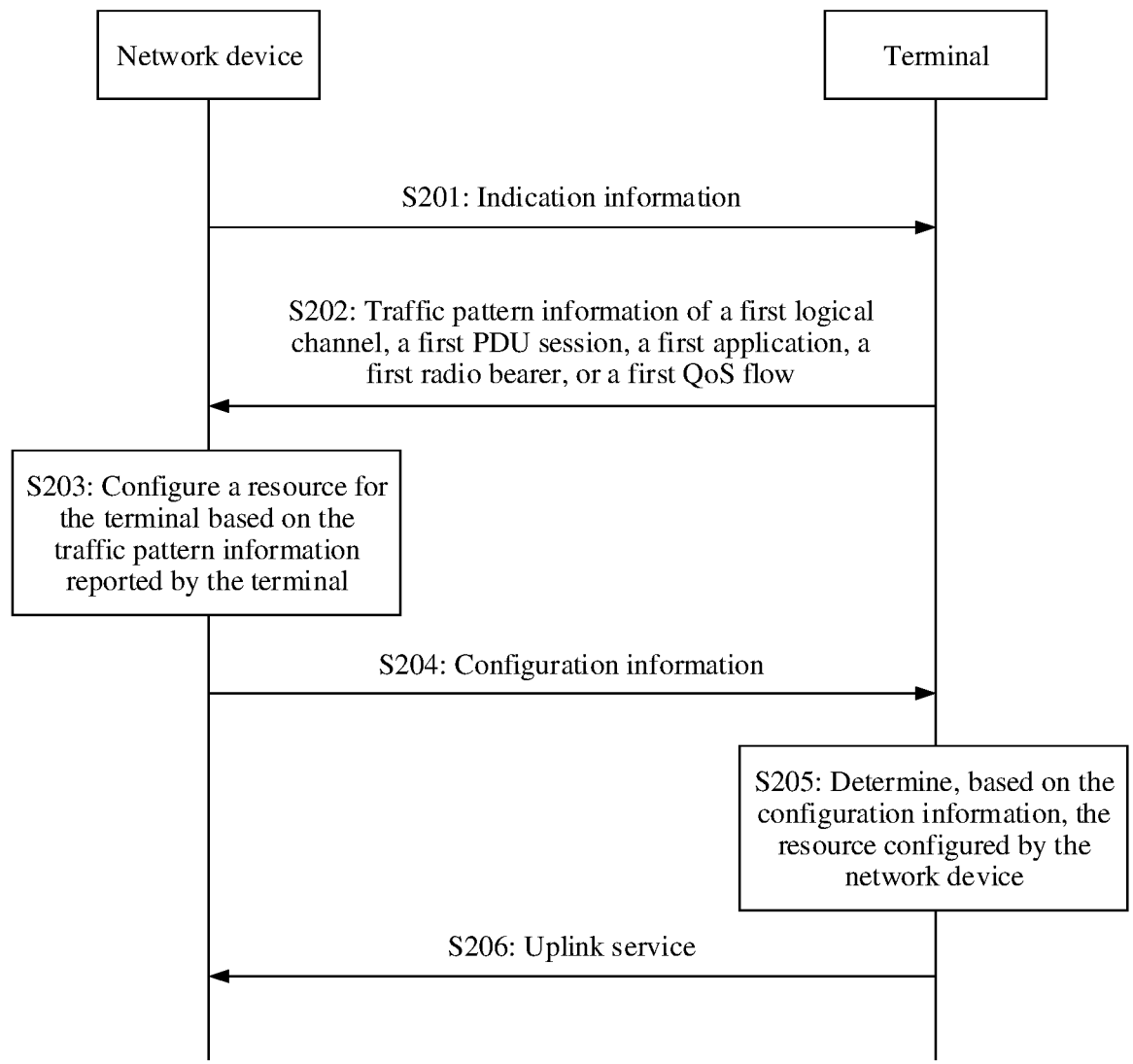
FIG. 2 is an interaction flowchart of Embodiment 1 of a communication method according to this application.

FIG. 2 is an interaction flowchart of Embodiment 1 of a communication method according to this application. As shown in FIG. 2, an interaction process between a terminal and a network device includes the following steps.

S201: The network device sends indication information to the terminal, where the indication information is used to indicate the terminal to report traffic pattern information of a first logical channel, a first PDU session, a first application, a first radio bearer, or a first QoS flow.

For example, the traffic pattern information may include one or more of the following information: a start time, a periodicity (traffic Periodicity), a message size, a logical channel identifier, a reliability requirement, and a latency performance requirement of a service. For example, the terminal reports the traffic periodicity. In this way, the network device may configure a periodicity of a CG resource based on the periodicity. For another example, the terminal reports the start time. In this way, the network device may configure a time offset of a CG resource based on the start time, and the offset may be a time offset relative to SFN=0. For another example, the terminal reports the message size. In this way, the network device may configure a size of a CG resource based on the message size. Optionally, the terminal may report the traffic periodicity, the start time, and the message size of the service. When only one of the traffic periodicity, the start time, and the message size of the service changes, the terminal may report only the changed information. For example, when the traffic periodicity changes, the terminal may report only the traffic periodicity. For another example, when the message size changes, the terminal may report only the message size.

Optionally, the terminal may further report the logical channel identifier, the reliability requirement, or the latency performance requirement. Herein, the term "or" has a non-exclusive meaning, that is, a part or all of the logical channel identifier, the reliability requirement, and the latency performance requirement may be reported.

The message size is a maximum transport block size in a traffic pattern. It may be understood that the message size is a maximum transport block size for a service on a logical channel. The logical channel identifier is a logical channel identifier associated with a traffic pattern reported on a logical channel. The periodicity is an estimated data arrival periodicity on a logical channel. The start time is an estimated data packet arrival time on a logical channel. The start time may be a time offset relative to SFN=0.

Optionally, the network device may send the indication information by using radio resource control (RRC) signaling.

For example, the indication information may include an identifier of the logical channel, the PDU session, the application, the radio bearer, or the QoS flow, for example, a number of the logical channel.

For example, the indication information indicates the logical channel. The network device may indicate an identifier of one logical channel in one piece of indication information, or may indicate identifiers of a plurality of logical channels in one piece of indication information. This is not specifically limited in this application.

Optionally, the traffic pattern information is pattern information for a service carried on a logical channel.

Optionally, the traffic pattern information is pattern information for a service carried on a PDU session.

Optionally, the traffic pattern information is pattern information for a service on an application.

Optionally, the traffic pattern information is pattern information for a service carried on a radio bearer.

Optionally, the traffic pattern information is pattern information for a service carried on a QoS flow.

S202: The terminal reports the traffic pattern information of the first logical channel, the first PDU session, the first application, the first radio bearer, or the first QoS flow based on the indication information.

For example, the indication information indicates the logical channel. After receiving the indication information sent by the network device, the terminal determines, based on the identifier that is of the logical channel and that is carried in the indication information, a logical channel on which traffic pattern information of a service needs to be reported to the network device. Further, the terminal obtains the traffic pattern information of the logical channel, and reports the traffic pattern information, for example, one or more of a start time, a periodicity, and a message size, of the logical channel to the network device.

S203: The network device configures a resource for the terminal based on the traffic pattern information reported by the terminal.

For example, when the traffic pattern information includes the start time, the periodicity, and the message size of the service, the network device may obtain a maximum data block and a service data arrival periodicity of the terminal in the traffic pattern based on the information, and determine the periodicity of the CG resource and the size of the resource based on the maximum data block and the service data arrival periodicity. For another example, if the traffic pattern information includes the start time of the service, the network device determines a start time of the resource based on the start time of the service, so that uplink data can be sent on a preconfigured periodic resource upon arrival of service data, and no additional latency for waiting is caused. If the traffic pattern information does not include the start time of the service, the network device may configure a start time of the resource based on a default start time. For another example, if the traffic pattern information includes the periodicity of the service, the network device may configure the periodicity of the resource based on the periodicity, so that a periodicity of service data matches a configuration of the resource, the service data is sent in time, and a latency for waiting is reduced. If the traffic pattern information does not include the periodicity of the service, the network device may configure the periodicity of the resource based on a default periodicity. For another example, if the traffic pattern information includes the message size of the service, the network device may configure the size of the resource based on the message size. If the traffic pattern information does not include the message size of the service, the network device may configure a default resource size.

When no CG resource is available, the terminal sends a scheduling request or a BSR to request a dynamically allocated resource from a network. If the network device determines, based on the logical channel on which the service of the terminal is located, that a CG resource is more applicable to the service, the network device configures the CG resource for the terminal, notifies the terminal of the CG resource, and notifies the terminal that the CG resource is for the logical channel. In other words, the network device sends configuration information to the terminal. The configuration information includes information about the logical channel and information about the CG resource. The information about the logical channel and the information about the CG resource may be located in a same configuration message, or may be separately configured. Similarly, the network device may determine, based on the QoS flow, the PDU session, the application, or the radio bearer on which the service of the terminal is located, that a CG resource is more applicable to the service. In this case, the network device configures the CG resource for the terminal, notifies the terminal of the CG resource, and notifies the terminal that the CG resource is for the QoS flow, the PDU session, the application, or the radio bearer. In other words, the network device sends configuration information to the terminal. The configuration information includes information about the QoS flow, the PDU session, the application, or the radio bearer and information about the CG resource. The information about the QoS flow, the PDU session, the application, or the radio bearer and the information about the CG resource may be located in a same configuration message, or may be separately configured.

S204: The network device sends the configuration information to the terminal, where the configuration information is used to indicate the resource configured by the network device to the terminal.

Optionally, a process in which the network device sends the configuration information to the terminal may be considered as a process in which the network device configures an uplink grant resource for the terminal.

In an optional implementation, the configuration information may be carried in RRC signaling.

The RRC signaling may be used to indicate the uplink grant resource preconfigured for the terminal to use. A configured grant configuration (ConfiguredGrantConfig) information element (IE) in the RRC signaling may carry a start position, a resource size, and a periodicity of the uplink grant resource, so that the terminal determines a time domain position and a frequency domain position of the uplink grant resource. The resource indicated by using the RRC signaling appears periodically until the resource is deleted by using RRC signaling. This configuration mode may be referred to as a configured grant type 1.

In another optional implementation, the configuration information may be carried in downlink control information, or may be carried in RRC signaling and downlink control information.

The network device may first indicate, by using the RRC signaling, information such as a periodicity of the uplink grant resource preconfigured for the terminal to use. When receiving the downlink control information, the terminal may activate and start using the preconfigured uplink grant resource based on information, such as a start position and a resource size of the uplink grant resource and a modulation and coding scheme (MCS) that matches the uplink grant resource, that is carried in the downlink control information. The downlink control information may be used to indicate a specific resource. Unless a deactivation command is received, the resource indicated by using the downlink control information periodically appears. This configuration mode may be referred to as a configured grant type 2.

In this case, the periodicity of the resource is sent by using the RRC signaling, and the size and position information of the resource are sent by using the downlink control information. The configuration information may be understood as information in the downlink control information, or may be understood as information in both the RRC signaling and the downlink control information.

In the configuration mode, the uplink grant resource may be preconfigured, for example, may be a semi-persistent scheduling (SPS) resource or a configured grant resource.

In the configuration mode, the uplink grant resource may serve a periodic service, and the network device does not need to deliver control signaling each time to allocate a resource. This reduces control signaling overheads. The uplink grant resource may also be used for some latency-sensitive services, for example, an ultra-reliable low-latency communication (URLLC) service. Because a latency requirement of this type of service needs to be met, and this type of service may arrive at any time, it may be excessively slow to request a resource by using a scheduling request or through random access. Therefore, the network device preconfigures dense periodic resources. When the terminal needs to send data of this type of service to the network device, the periodic resource can be immediately used for sending, to reduce a latency.

S205: The terminal determines, based on the configuration information, the resource configured by the network device.

For example, the network device uses the configured grant type 1. The network device includes the start position, the resource size, and the periodicity of the uplink grant resource in the RRC signaling. After receiving the RRC signaling, the terminal may learn of a periodicity and a position in each periodicity that are used for the terminal to start the resource. In this way, the terminal sends information on the resource.

S206: The terminal sends an uplink service on the resource configured by the network device.

In this embodiment, the network device indicates, to the terminal, a logical channel, a PDU session, a service, a radio bearer, or a QoS flow whose traffic pattern information may be reported, and the terminal reports, based on the indication, the traffic pattern information of only the logical channel, the PDU session, the service, the radio bearer, or the QoS flow that is indicated by the network device. Further, the network device configures the resource for the terminal based on the traffic pattern information reported by the terminal. In this way, reporting of the traffic pattern information is controlled by the network device, to reduce reporting overheads.

Optionally, the foregoing logical channel may be replaced with a logical channel group. To be specific, the indication information sent by the network device is used to indicate the terminal to report traffic pattern information of a first logical channel group, and the terminal reports traffic pattern information of a logical channel in the first logical channel group based on the indication information.

Figure 3:
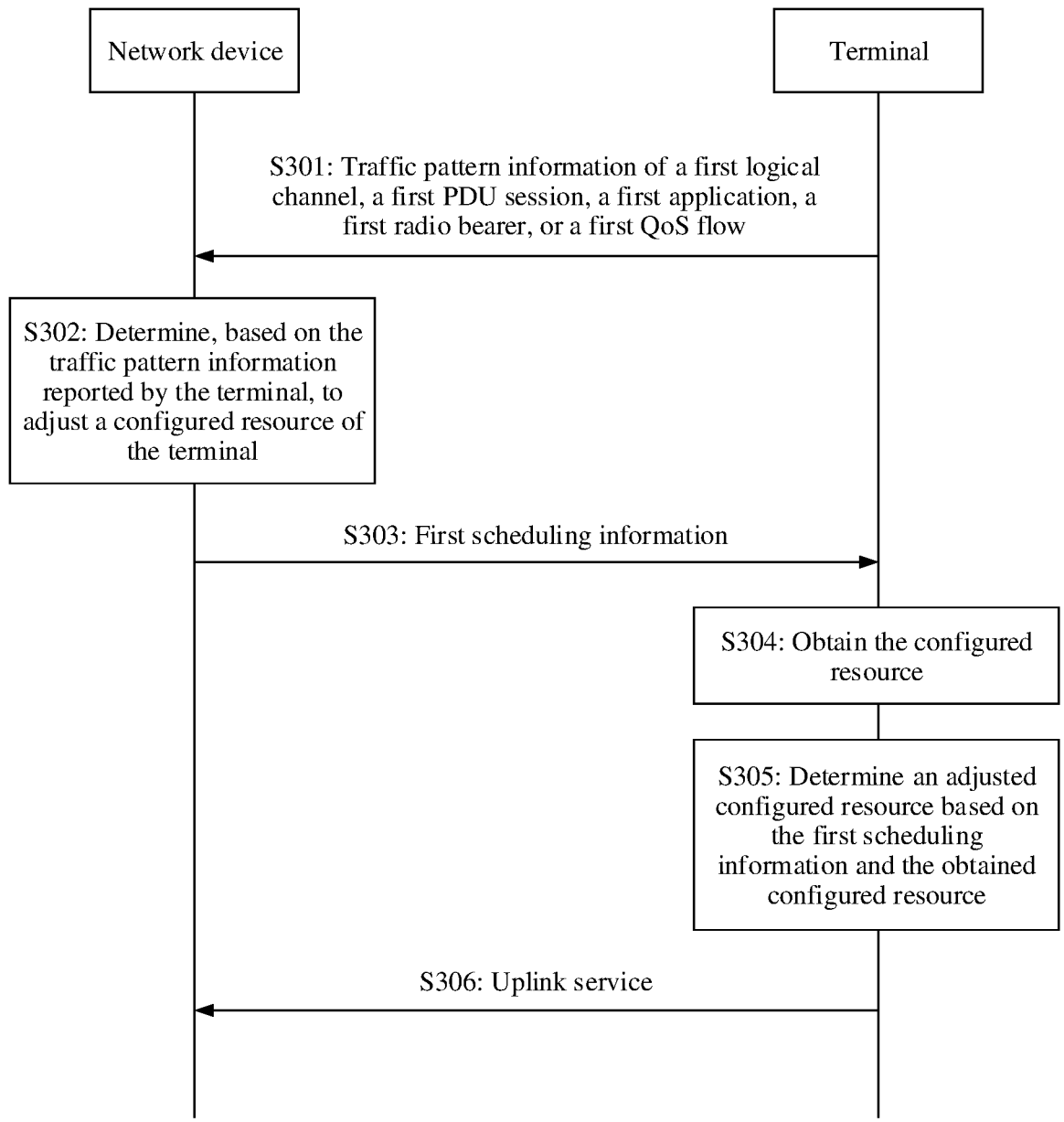
FIG. 3 is an interaction flowchart of Embodiment 2 of a communication method according to this application.

FIG. 3 is an interaction flowchart of Embodiment 2 of a communication method according to this application. As shown in FIG. 3, an interaction process between a terminal and a network device includes the following steps.

S301: The terminal reports traffic pattern information of a first logical channel, a first PDU session, a first application, a first radio bearer, or a first QoS flow to the network device.

S302: The network device determines, based on the traffic pattern information reported by the terminal, to adjust a configured resource of the terminal.

In an optional manner, the traffic pattern information includes traffic pattern change information, and may include change information of any type of traffic pattern information in the foregoing embodiment. The change information may be changed traffic pattern information or a variation of the traffic pattern information, for example, a start time variation, a periodicity variation, or a data size variation. The network device may determine, based on the traffic pattern change information, that a traffic pattern of the terminal changes, and further determine to adjust the configured resource of the terminal.

In another optional manner, the network device may determine, by comparing the traffic pattern information reported by the terminal with traffic pattern information that is reported by the terminal last time and that is stored in the network device, that a traffic pattern of the terminal changes, and further determine to adjust the configured resource of the terminal.

It should be noted that the foregoing steps S301 and S302 are merely a possible implementation of determining, by the network device, to adjust the configured resource of the terminal. In a specific implementation process, the network device may alternatively determine, in another manner, to adjust the configured resource of the terminal.

For example, the network device obtains the traffic pattern information from assistance information delivered by a core network device. The core network device may be a device such as an access and mobility management function (AMF) device or a session management function (SMF) device. The network device determines, based on the traffic pattern information sent by the core network device, to adjust the configured resource of the terminal.

S303: The network device sends first scheduling information to the terminal, where the first scheduling information is used to adjust the configured resource of the terminal.

In an industrial control scenario, terminals of a same type may have same traffic pattern information. Therefore, the traffic pattern information of a plurality of terminals of the same type may simultaneously change. Therefore, in this step, the network device may send the first scheduling information to the plurality of terminals of the same type. If the network device separately sends the first scheduling information to the terminals, a relatively high latency and relatively high overheads may be caused.

To resolve this problem, the network device may classify the terminals of the same type into one group, and allocate a group identifier to the group. The group identifier is used to identify the group, in other words, the group identifier uniquely identifies one group.

Further, in this step, the network device scrambles the first scheduling information by using the group identifier. Further, the network device sends the first scheduling information.

Optionally, the first scheduling information is used to adjust a time domain position of the configured resource of the terminal.

For example, the first scheduling information includes an adjustment value of time domain position information.

Optionally, the first scheduling information may be sent by using one piece of downlink control information (DCI) signaling. Because the first scheduling information is scrambled by using the group identifier, all the terminals belonging to the group corresponding to the group identifier may obtain the first scheduling information by using the piece of DCI signaling.

The following Table 1 lists an example of resource allocation to terminals that belong to a group whose group identifier is a group identifier 1. As shown in Table 1, there are N terminals in the group corresponding to the group identifier 1, where N is an integer greater than 1. A resource of a terminal 1 is a CG 1, a resource of a terminal 2 is a CG 2, and a resource of a terminal N is a CG N. After the network device sends the first scheduling information scrambled by using the group identifier 1, the terminal 1, the terminal 2, . . . , and the terminal N may all obtain, through parsing, a time domain position adjustment value carried in the first scheduling information. In this case, the terminal 1 may determine a new resource of the terminal 1 based on a time domain position of the CG 1 and the time domain position adjustment value in the first scheduling information. The terminal 2 may determine a new resource of the terminal 2 based on a time domain position of the CG 2 and the time domain position adjustment value in the first scheduling information. The rest can be deduced by analogy.

TABLE 1

| Group identifier 1 | Terminal | Resource |
| --- | --- | --- |
| Group identifier 1 (Service 1) | Terminal 1 | CG 1 |
|  | Terminal 2 | CG 2 |
|  | . . . | . . . |
|  | Terminal N | CG N |

In an optional manner, if the terminal has a plurality of CG resources, the network device indicates an index value of a CG resource in the first scheduling information.

In the manner, when allocating a plurality of CG resources to the terminal, the network device simultaneously allocates an index value to each CG resource. Referring to the following Table 2, CG resources allocated by the network device to the terminal 1 are the CG 1 and a CG 1', an index value of the CG 1 is 1, and an index value of the CG 1' is 2. CG resources allocated by the network device to the terminal 2 are the CG 2 and a CG 2', an index value of the CG 2 is 1, and an index value of the CG 2' is 2. The rest can be deduced by analogy. For example, when adjusting, by using the first scheduling information, configured resources of the terminals in the group corresponding to the group identifier 1, the network device may indicate an index value of a CG resource in the first scheduling information. For example, an index value 1 is included in the first scheduling information. After the terminals in the group corresponding to the group identifier 1 receive the first scheduling information, the terminals may learn that resources that need to be adjusted are the resources CG 1, CG 2, . . . , and the CG N whose resource indexes are 1. In this case, the terminal 1 may learn that the resource CG 1 is to be adjusted based on the first scheduling information, the terminal 2 may learn that the resource CG 2 is to be adjusted based on the first scheduling information, and the reset can be deduced by analogy.

TABLE 2

| Group identifier 1 | Terminal | Resource index 1 | Resource index 2 |
|---|---|---|---|
| Group identifier 1 (Service 1) | Terminal 1 | CG 1 | CG 1' |
| | Terminal 2 | CG 2 | CG 2' |
| | . . . | . . . | . . . |
| | Terminal N | CG N | CG N' |

In an optional manner, if the terminal has a plurality of CG resources, the network device may configure a corresponding scheduling identifier for each CG resource. The scheduling identifier is used for management of only the resource. The management includes resource adjustment, initial resource allocation, and resource release.

Optionally, the first scheduling information is used to adjust a frequency domain resource position of the configured resource of the terminal, or is used to adjust a time domain resource position and a frequency domain resource position of the configured resource of the terminal.

S304: The terminal obtains the configured resource.

Optionally, the configured resource may be indicated by the network device to the terminal in advance. For example, the network device may configure the resource for the terminal in the manner described in the foregoing step S204. Further, in this embodiment, the terminal may obtain the configured resource based on the indication of the network device. For example, the network device indicates a start position, a resource size, and a periodicity of the resource, and the terminal may learn of the time domain position and the frequency domain position of the resource based on the start position, the resource size, and the periodicity of the resource.

Step 304 may be performed before any one of the foregoing steps, in other words, a sequence between step 304 and another step is not limited.

S305: The terminal determines an adjusted configured resource based on the first scheduling information and the obtained configured resource.

For example, the first scheduling information includes the time domain position adjustment value. In addition, in the foregoing step, the terminal has obtained the time domain position of the resource that is configured before the first scheduling information is received. In this case, the terminal may obtain a time domain position of the adjusted resource through calculation based on the time domain position that is configured before the first scheduling information is received and the time domain position adjustment value that is included in the first scheduling information.

S306: The terminal performs an uplink service on the adjusted configured resource.

For example, the terminal obtains the time domain position of the adjusted resource based on the obtained time domain position of the resource and the time domain position adjustment value that is included in the first scheduling information. When needing to send uplink data to the network device, the terminal sends the uplink data in the time domain position of the adjusted resource.

In this embodiment, the network device allocates one group identifier to devices of a same type. When needing to adjust resources for a plurality of terminals of the same type, the network device scrambles, by using the group identifier, the first scheduling information used to adjust configured resources of the terminals, and all the terminals belonging to a group corresponding to the group identifier can receive the first scheduling information. In this way, the scheduling information for the plurality of terminals of the same type is indicated by using one instruction, to reduce overheads. In addition, a latency caused by the change of the traffic pattern may also be reduced by using the first scheduling information.

Figure 4:
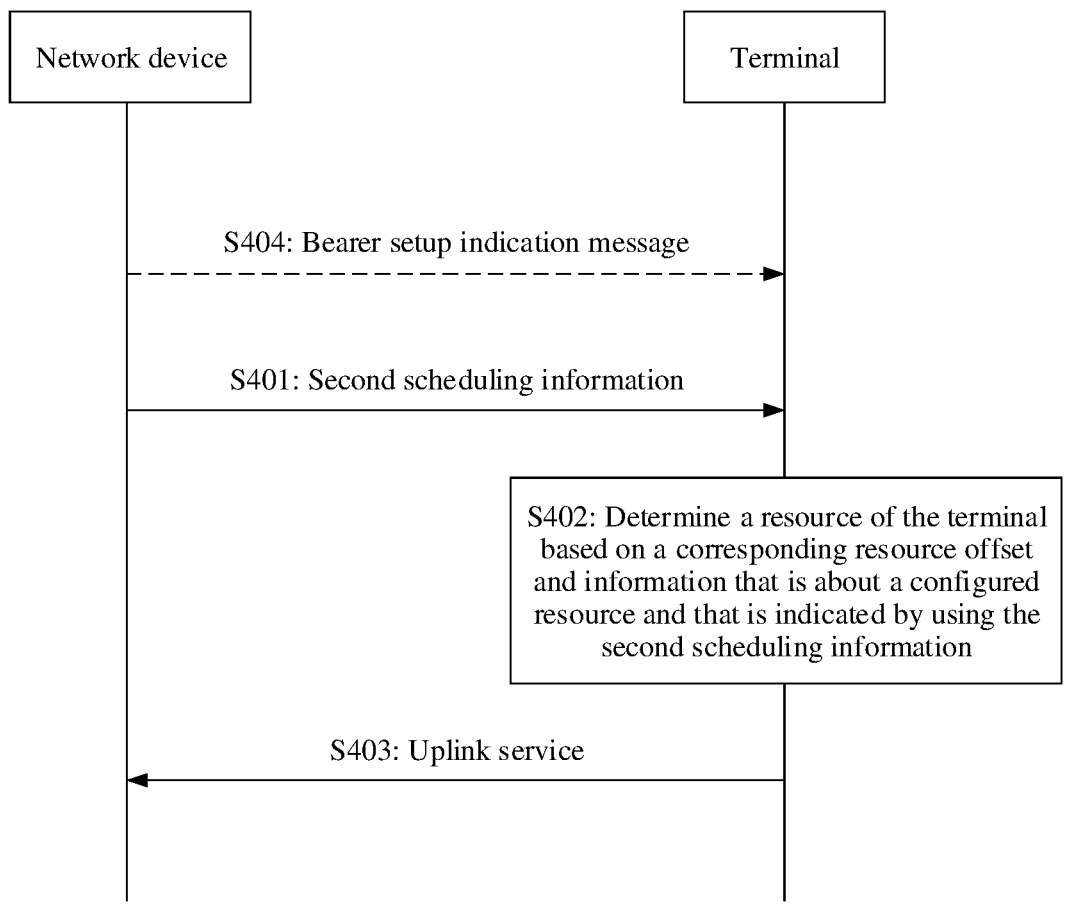
FIG. 4 is an interaction flowchart of Embodiment 3 of a communication method according to this application.

FIG. 4 is an interaction flowchart of Embodiment 3 of a communication method according to this application. As shown in FIG. 4, an interaction process between a terminal and a network device includes the following steps.

S401: The network device sends second scheduling information to the terminal, where the second scheduling information is used to indicate information about a configured resource.

Optionally, the information about the configured resource may be time domain position information, frequency domain position information, or time domain position information and frequency domain position information of the resource.

In an industrial control scenario, terminals of a same type may have same traffic pattern information. Therefore, resources may simultaneously need to be scheduled for the traffic pattern information of a plurality of terminals of the same type. Therefore, in this step, the network device needs to send the second scheduling information to the plurality of terminals of the same type. If the network device separately sends the second scheduling information to the terminals, relatively high overheads may be caused.

To resolve this problem, the network device may classify the terminals of the same type into one group, and allocate a group identifier to the group. The group identifier is used to identify the group, in other words, the group identifier uniquely identifies one group.

Further, in this step, the network device scrambles the second scheduling information by using the group identifier. Further, the network device sends the second scheduling information.

Optionally, the second scheduling information may be sent by using one piece of DCI signaling. Because the second scheduling information is scrambled by using the group identifier, all the terminals belonging to the group corresponding to the group identifier may obtain the second scheduling information by using the piece of DCI signaling.

S402: The terminal determines a configured resource of the terminal based on a corresponding resource offset and the information that is about the configured resource and that is indicated by using the second scheduling information.

Optionally, each terminal that belongs to a same group may have a piece of resource offset information.

The following Table 3 lists an example of resource allocation to terminals that belong to a group whose group identifier is a group identifier 1. As shown in Table 3, there are N terminals in the group corresponding to the group identifier 1, where N is an integer greater than 1. The network device may scramble the second scheduling information by using the group identifier 1. A frequency domain position indicated by using the second scheduling information is a PRB 1. In other words, a frequency domain position of each terminal in the group corresponding to the group identifier 1 is based on the PRB 1. Then, each terminal determines the frequency domain position of the terminal based on the PRB 1 and a resource offset corresponding to the terminal. For example, if a resource offset of a terminal 1 is Offset1, a frequency domain resource of the terminal 1 is the PRB 1+Offset1. The rest can be deduced by analogy.

TABLE 3

| | Terminal | Resource offset | Frequency domain resource |
|---|---|---|---|
| Group identifier 1 (Service 1) | Terminal 1 | Offset1 (for example, 0) | PRB 1 + Offset1 |
| | Terminal 2 | Offset2 (for example, 4) | PRB 1 + Offset2 |
| | ... | ... | ... |
| | Terminal N | Offset3 (for example, 16) | PRB 1 + Offset3 |

Optionally, the resource offset corresponding to the terminal may be indicated by the network device in advance.

For example, the network device may indicate the corresponding resource offset to the terminal in advance, for example, by using RRC signaling.

S403: The terminal sends an uplink service on the resource configured by the network device.

Optionally, the foregoing method may further include the following step:

S404: The network device sends a bearer setup indication message to the terminal, where the indication message is used to indicate the terminal to set up a radio bearer.

In this way, the network device may configure the resource, namely, the resource in step 401, for the terminal based on a traffic pattern on the bearer.

In an optional implementation, after obtaining traffic pattern information from the terminal, the network device configures the resource for the terminal based on the traffic pattern information. For a specific processing process, refer to steps S202 and S203, and details are not described herein again. Then, the network device indicates, by using the indication message, the terminal to set up the bearer.

In another optional implementation, the network device obtains traffic pattern information from assistance information delivered by a core network device. The core network device may be a device such as an AMF device or an SMF device. The network device configures the resource for the terminal based on the traffic pattern information sent by the core network device, and indicates, by using the indication message, the terminal to set up the bearer.

The terminal may determine the resource of the terminal based on the information that is about the resource and that is indicated by using the second scheduling information and the resource offset corresponding to the terminal. When needing to send uplink data to the network device, the terminal may send the uplink data on the resource.

In this embodiment, the network device allocates one group identifier to devices of a same type, and terminals in a group identified by the group identifier each have a resource offset. When needing to schedule resources for a plurality of terminals of the same type, the network device scrambles, by using the group identifier, the second scheduling information used to indicate configured resources of the terminals, and all the terminals belonging to the group corresponding to the group identifier can receive the second scheduling information. A resource allocated to each terminal can be determined by using the resource offset of the terminal and information that is about the resources and that is indicated by using the second scheduling information. In this way, scheduling information for the plurality of terminals of the same type is indicated by using one instruction, to reduce overheads.

Figure 5:
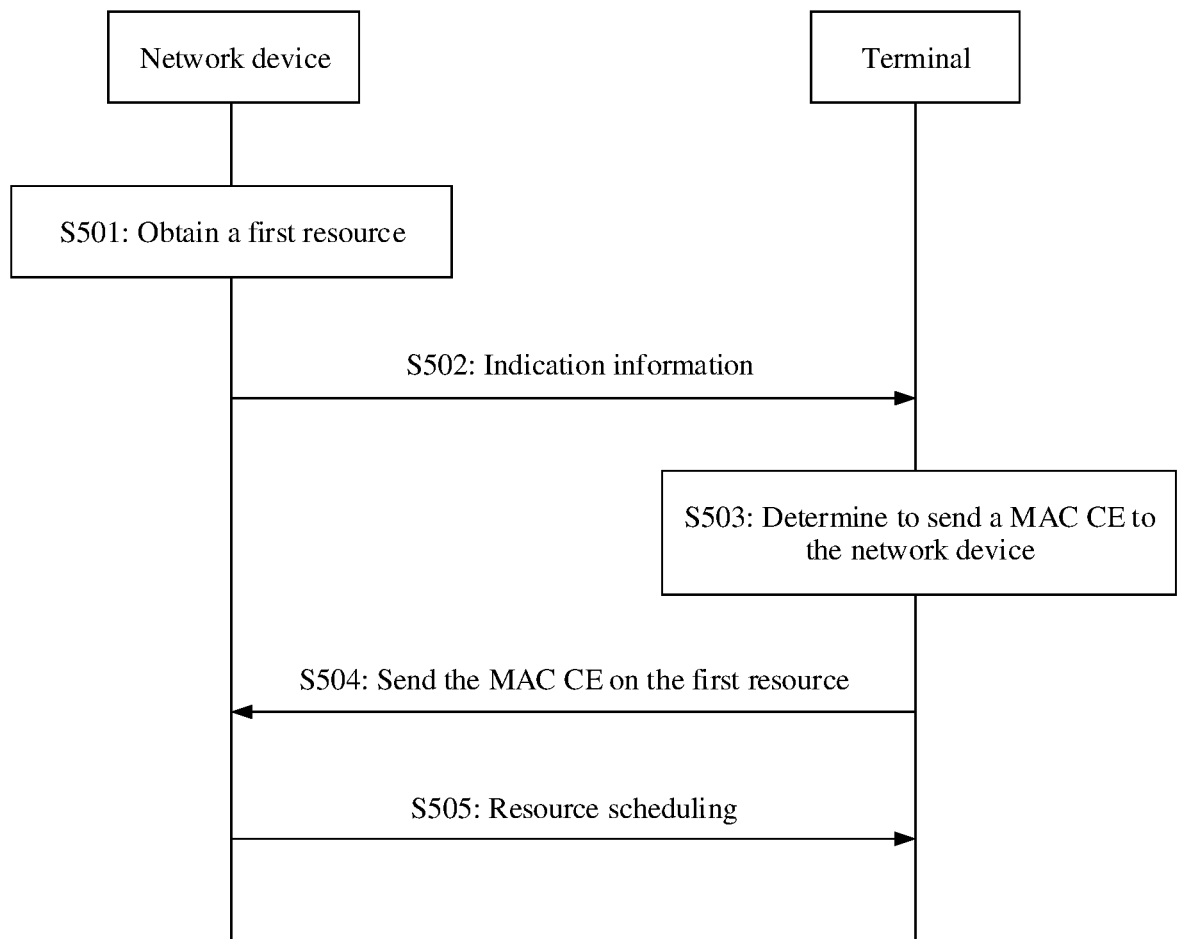
FIG. 5 is an interaction flowchart of Embodiment 4 of a communication method according to this application.

FIG. 5 is an interaction flowchart of Embodiment 4 of a communication method according to this application. As shown in FIG. 5, an interaction process between a terminal and a network device includes the following steps.

S501: The terminal obtains a first resource.

Optionally, the terminal may obtain a start position, a resource size, a periodicity, and the like of the first resource.

Optionally, the terminal actively requests a network to allocate the first resource. After receiving the request, the network device allocates the first resource to the terminal.

Optionally, a network actively sends the allocated first resource to the terminal. For example, the first resource is determined based on a type of the terminal or a QoS requirement of a service used by the terminal.

Optionally, the first resource may be a physical uplink control channel (PUCCH) resource or a physical uplink shared channel (PUSCH) resource.

S502: The network device sends indication information to the terminal, where the indication information is used to indicate that the first resource is used to send a MAC CE.

Optionally, in this application, the MAC CE may include a BSR. Correspondingly, that the indication information is used to indicate that the first resource is used to send a MAC CE may specifically mean that the indication information is used to indicate that the first resource is used to send the BSR.

A MAC PDU of each MAC CE has a MAC sub-header, and a field in the sub-header is an identifier of a logical channel. The identifier of the logical channel is used to indicate a type of the MAC CE. Optionally, the indication information is used to indicate that the first resource is used to send the identifier that is of the logical channel and that is in the MAC sub-header of the MAC CE. It is determined based on the indication that the first resource is only used to send a MAC CE of the specific type.

It should be noted that in this application, that the first resource is used to send a MAC CE means that the first resource is specially used to send the MAC CE, or that the first resource is only used to send the MAC CE, or that the first resource is not used to send service data. The service data is at a protocol layer above a MAC layer. For example, the service data may be a PDU at each layer. Alternatively, in this application, that the indication information is used to indicate that the first resource is used to send a MAC CE means that the indication information is used to indicate whether a MAC CE of a preset logical channel is allowed to be sent on the first resource.

Alternatively, in this application, that the indication information is used to indicate that the first resource is used to send a MAC CE means that the indication information is used to indicate whether a BSR MAC CE triggered by a service of a preset logical channel is allowed to be sent on the first resource.

Alternatively, in this application, that the indication information is used to indicate that the first resource is used to send a MAC CE means that the indication information is used to indicate whether a BSR MAC CE triggered by a service in a preset logical channel group is allowed to be sent on the first resource.

When the terminal has a plurality of first resources, the network device may indicate a first resource to be used to send the MAC CE. Certainly, the network device may alternatively indicate a first resource to be used for sending and a type of a MAC CE to be sent.

For ease of description, an example in which the MAC CE is the BSR is used for description in the following embodiments of this application. However, it is clear that this application is not limited thereto.

S503: The terminal determines to send the MAC CE to the network device.

Optionally, the BSR is used to provide the network device with an uplink data volume, of the terminal, in a MAC entity. When any one of the following conditions is met, the terminal may be triggered to send the MAC CE to the network device, that is, the terminal may determine to generate one MAC CE. When a resource available for sending the MAC CE appears, the MAC CE is sent on the resource.

1. The MAC entity has new available uplink data on a logical channel that belongs to a logical channel group.

In an example, the new uplink data belongs to a logical channel, and a priority of the logical channel is higher than a priority of any logical channel that has available data.

In another example, no logical channel in logical channels belonging to the logical channel group has available uplink data.

2. An uplink resource is allocated, and a quantity of padding bits is greater than or equal to a size of the BSR MAC CE and a size of the MAC sub-header.

3. A BSR retransmission timer expires, and at least one logical channel that belongs to a logical channel group has uplink data.

4. A periodic BSR timer expires.

S504: The terminal sends the MAC CE on the first resource.

Optionally, the terminal may send, on the first resource, a MAC CE corresponding to a first logical channel or a first logical channel group. To be specific, the terminal may send, on the first resource, a MAC CE corresponding to a specific logical channel in the MAC sub-header, or a BSR MAC CE that is included in a BSR and that is triggered by one or more logical channels (or one or more logical channel groups).

Each logical channel may be allocated to one logical channel group, and one logical channel group may include a plurality of logical channels. For example, one logical channel group may include a maximum of eight logical channels.

In this application, these logical channels or logical channel groups may be obtained in the following two optional manners.

In a first manner, the first logical channel or the first logical channel group is indicated by the network device in advance.

In the manner, the network device may indicate, to the terminal in advance, a logical channel that is in the MAC sub-header and that corresponds to a MAC CE capable of being reported on the first resource.

In the manner, the network device may indicate, to the terminal in advance, one or more logical channels or logical channel groups that trigger BSR MAC CEs capable of being reported on the first resource.

In an example, the network device may indicate the first logical channel or the first logical channel group by using the foregoing indication information.

That is, the indication information is further used to indicate the first logical channel or the first logical channel group in addition to indicating that the first resource is used to send the MAC CE.

In the manner, after receiving the indication information sent by the network device, the terminal may learn of one or more logical channels or logical channel groups whose MAC CEs can be specially sent by the terminal on the first resource.

In another example, the network device may indicate the first logical channel or the first logical channel group by using separate information.

For example, the network device first sends the indication information by using a message, and then sends another message, where the first logical channel or the first logical channel group is indicated in the another message.

In a second manner, the first logical channel is a logical channel whose priority is greater than or equal to a preset threshold, and the first logical channel group is a logical channel group whose priority is greater than or equal to a preset threshold.

In the manner, each logical channel or logical channel group has one piece of priority information. A logical channel is used as an example. When the terminal determines that a BSR of the logical channel needs to be sent to the network device, the terminal first determines whether a priority of the logical channel is greater than or equal to the preset threshold. If the priority of the logical channel is greater than or equal to the preset threshold, the terminal sends the BSR of the logical channel on the first resource.

S505: The network device schedules, based on the MAC CE sent by the terminal, a resource for the terminal to transmit uplink data.

In this embodiment, a dedicated resource specially used to send the MAC CE such as the BSR is allocated to the terminal, so that sending of the MAC CE such as the BSR does not affect sending of periodic service data. This reduces a latency that occurs for a periodic service.

In an optional implementation, when the MAC CE includes the BSR, the terminal may trigger sending of the BSR in the following cases:

When a data buffer size of the first logical channel or the first logical channel group is greater than 0, the terminal sends the BSR on the first resource. In this way, a probability of sending a BSR when there is no uplink data to be sent is reduced, to avoid increasing unnecessary uplink load.

Optionally, the BSR MAC CE includes a buffer size (Buffer Size) field, and the field identifies all available data of all logical channels in one logical channel group. For a long BSR or a long truncated BSR, data in the buffer size field may be 0. Therefore, when the data buffer size is greater than 0, the BSR MAC CE may be sent, and the data buffer size may be identified by using the buffer size field.

In an example, when the data buffer size of the first logical channel or the first logical channel group is greater than 0, the terminal sends the BSR of only the first logical channel or the first logical channel group on the first resource.

In another example, when the data buffer size of the first logical channel or the first logical channel group is greater than 0, in addition to sending the BSR of the first logical channel or the first logical channel group on the first resource, the terminal may further send, on the first resource, a BSR of another logical channel or logical channel group together with the BSR of the first logical channel or the first logical channel group.

In this manner, when any one of the following conditions is met, it may be considered that the data buffer size of the first logical channel is greater than 0:
1. There is data to be newly transmitted (new transmission) on the first logical channel.
2. There is data to be RLC-retransmitted on the first logical channel.
3. There is data to be newly transmitted and data to be RLC-retransmitted on the first logical channel.

The data to be newly transmitted is data to be transmitted for the first time.

The foregoing conditions are also applicable to the first logical channel group.

In an optional implementation, the first resource is a periodic transmission resource.

In an example, the first resource may be a resource configured in the manner of the configured grant type 1 that is described in the foregoing embodiment.

In another example, the first resource may be a resource configured in the manner of the configured grant type 2 that is described in the foregoing embodiment.

In still another example, the first resource may be a PUCCH resource.

Figure 6:
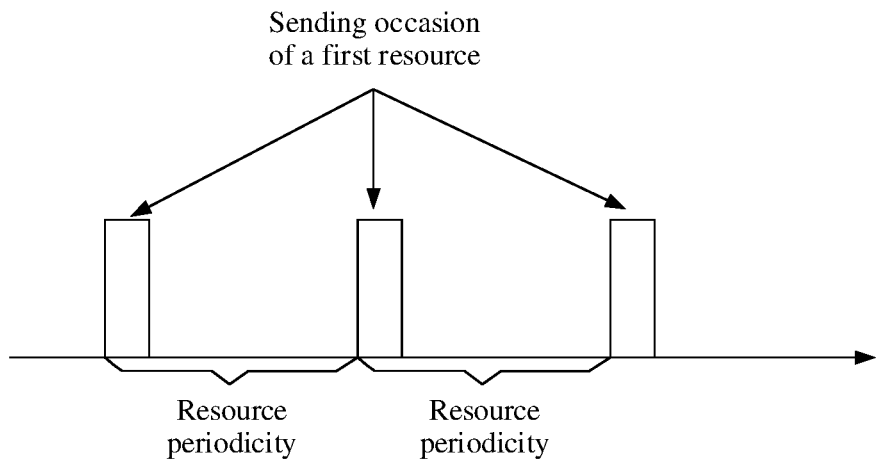
FIG. 6 is an example diagram of periodic sending of a first resource.

FIG. 6 is an example diagram of periodic sending of the first resource. As shown in FIG. 6, there is only one sending occasion of the first resource in each resource periodicity, and the terminal sends the first resource to the network device on the sending occasion.

Figure 7:
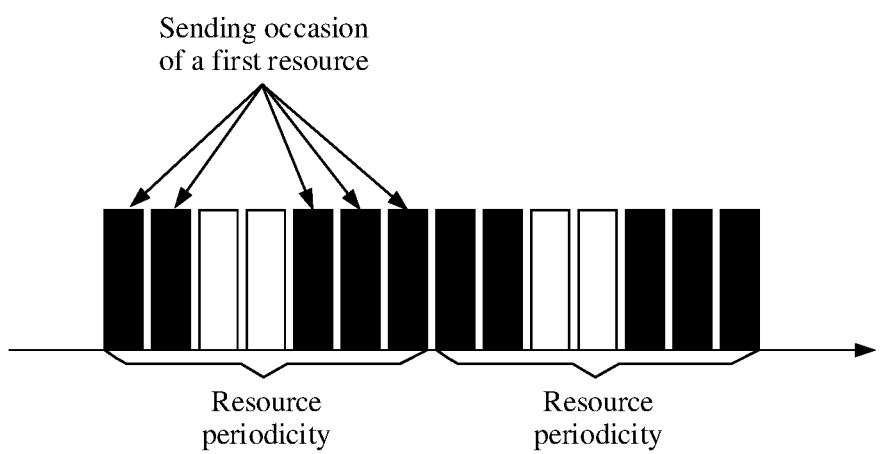
FIG. 7 is another example diagram of periodic sending of the first resource.

FIG. 7 is another example diagram of periodic sending of the first resource. As shown in FIG. 7, the first resource is at least one resource included in a resource periodicity. There are seven resource sending occasions in one resource periodicity, sizes of resources are the same, and offsets of time domain positions of the resources relative to SFN=0 are different. An offset of the $1^{st}$ resource is Offset1, an offset of the $2^{nd}$ resource is Offset2, and an offset of the $3^{rd}$ resource is Offset3. The rest can be deduced by analogy. Among the seven resource sending occasions, five resource sending occasions may be selected as sending occasions of the first resource. For example, in FIG. 7, the first resource sending occasion, the second resource sending occasion, the fifth resource sending occasion, the sixth resource sending occasion, and the seventh resource sending occasion may be selected as the sending occasions of the first resource.

In this manner, optionally, the network device may indicate the sending occasion of the first resource to the terminal in advance by using a bitmap. For example, in the example shown in FIG. 7, the network device may send a bitmap whose value is 1100111 to the terminal in advance, where 1 indicates that sending can be performed, and 0 indicates that sending cannot be performed. After receiving the bitmap, the terminal may learn that the first resource sending occasion, the second resource sending occasion, the fifth resource sending occasion, the sixth resource sending occasion, and the seventh resource sending occasion in one resource periodicity may be used as the sending occasions of the first resource.

Figure 8:
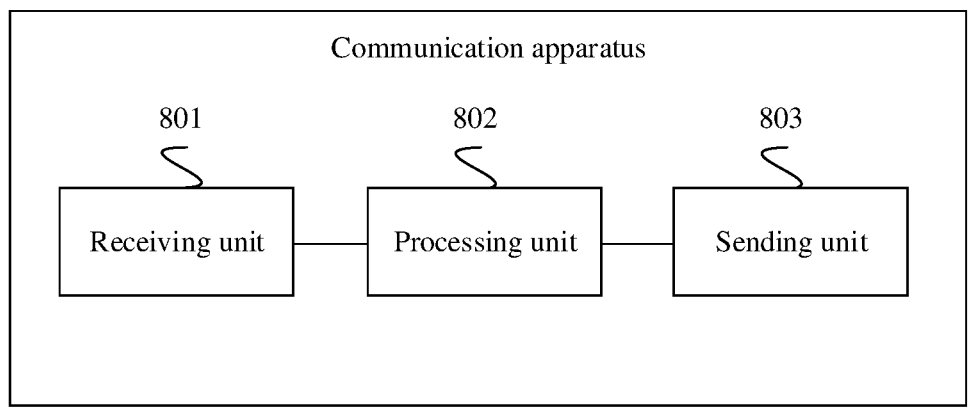
FIG. 8 is a schematic structural diagram of a communication apparatus according to an embodiment of this application.

FIG. 8 is a schematic structural diagram of a communication apparatus according to an embodiment of this application. The communication apparatus may include a unit (or means) configured to implement each step performed by the terminal in any one of the foregoing methods. The communication apparatus may be a terminal, or may be a chip used in a terminal. As shown in FIG. 8, the communication apparatus may include a receiving unit 801, a processing unit 802, and a sending unit 803.

The receiving unit 801 is configured to receive indication information from a network device, where the indication information is used to indicate the terminal to report traffic pattern information of a first logical channel, a first PDU session, a first application, a first radio bearer, or a first QoS flow.

The processing unit 802 is configured to report the traffic pattern information of the first logical channel, the first PDU session, the first application, the first radio bearer, or the first QoS flow through the sending unit 803 and based on the indication information.

In an implementation, the receiving unit 801 is further configured to:

receive configuration information from the network device, where the configuration information is used to indicate a configured resource allocated by the network device to the terminal based on the traffic pattern information.

In an implementation, the receiving unit 801 is further configured to: obtain the configured resource from the network device; and receive first scheduling information from the network device, where the first scheduling information is used to adjust the configured resource.

In an implementation, the first scheduling information is scrambled by using a group identifier.

In an implementation, the first scheduling information is used to adjust time domain position information of the configured resource.

In an implementation, the receiving unit 801 is further configured to: receive second scheduling information from the network device, where the second scheduling information is used to indicate information about the configured resource; and determine a resource of the terminal based on a corresponding resource offset and the information that is about the configured resource and that is indicated by using the second scheduling information.

In an implementation, the resource offset corresponding to the terminal is indicated by the network device in advance.

In an implementation, the second scheduling information is scrambled by using a group identifier, and the terminal is in a device group identified by the group identifier.

The communication apparatus provided in this embodiment of this application may perform an action on a terminal side in the foregoing method embodiments. Implementation principles and technical effects of the communication apparatus are similar to those in the method embodiments, and details are not described herein again.

Figure 9:
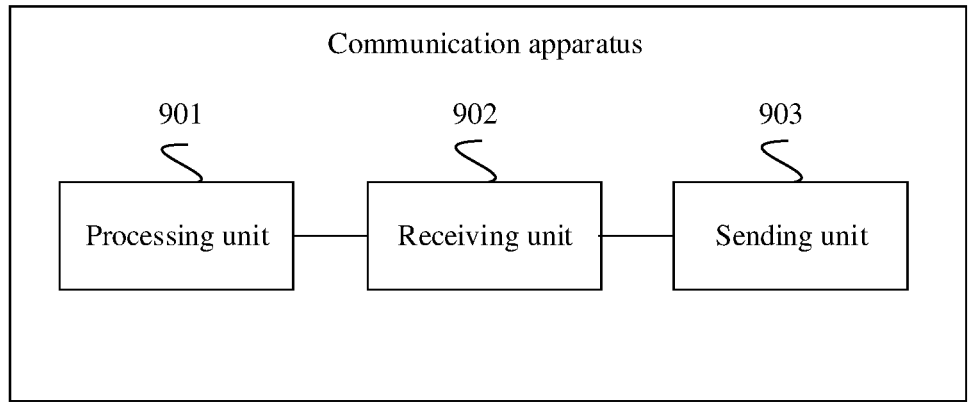
FIG. 9 is a schematic structural diagram of another communication apparatus according to an embodiment of this application.

FIG. 9 is a schematic structural diagram of another communication apparatus according to an embodiment of this application. The communication apparatus may include a unit (or means) configured to implement each step performed by the terminal in any one of the foregoing methods. The communication apparatus may be a terminal, or may be a chip used in a terminal. As shown in FIG. 9, the communication apparatus may include a processing unit 901, a receiving unit 902, and a sending unit 903.

The processing unit 901 is configured to obtain a first resource.

The receiving unit 902 is configured to receive indication information, where the indication information is used to indicate that the first resource is used to send a MAC CE.

The sending unit 903 is configured to send the MAC CE on the first resource.

In an implementation, the MAC CE includes a BSR.

In an implementation, the indication information is used to indicate that the first resource is used to send the BSR.

In an implementation, the first resource is a periodic transmission resource.

In an implementation, the sending unit 903 is specifically configured to: send, on the first resource, a MAC CE corresponding to a first logical channel or a first logical channel group.

In an implementation, the first logical channel or the first logical channel group is indicated by a network device in advance.

In an implementation, the indication information is further used to indicate the first logical channel or the first logical channel group.

In an implementation, the first logical channel is a logical channel whose priority is greater than or equal to a preset threshold, and the first logical channel group is a logical channel group whose priority is greater than or equal to a preset threshold.

In an implementation, the MAC CE includes a BSR, and the sending unit 903 is specifically configured to: when a data buffer size of the first logical channel or the first logical channel group is greater than 0, send the BSR on the first resource.

The communication apparatus provided in this embodiment of this application may perform an action on a terminal side in the foregoing method embodiments. Implementation principles and technical effects of the communication apparatus are similar to those in the method embodiments, and details are not described herein again.

Figure 10:
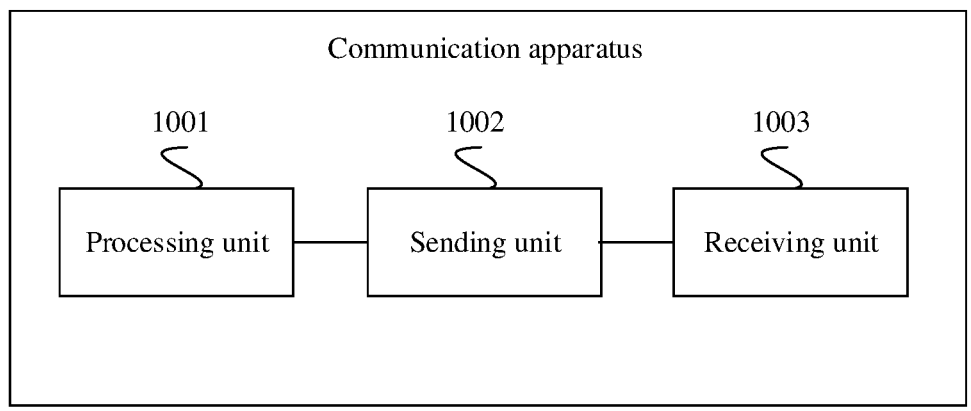
FIG. 10 is a schematic structural diagram of still another communication apparatus according to an embodiment of this application.

FIG. 10 is a schematic structural diagram of still another communication apparatus according to an embodiment of this application. The communication apparatus may include a unit (or means) configured to implement each step performed by the network device in any one of the foregoing methods. The communication apparatus may be a network device, or may be a chip used in a network device. As shown in FIG. 10, the communication apparatus may include a processing unit 1001, a sending unit 1002, and a receiving unit 1003.

The processing unit 1001 is configured to send indication information to a terminal through the sending unit 1002, where the indication information is used to indicate the terminal to report traffic pattern information of a first logical channel, a first PDU session, a first application, a first radio bearer, or a first QoS flow.

The receiving unit 1003 is configured to receive the traffic pattern information that is reported by the terminal based on the indication information and that is of the first logical channel, the first PDU session, the first application, the first radio bearer, or the first QoS flow.

In an implementation, the processing unit 1001 is further configured to: configure a resource for the terminal based on the traffic pattern information.

The sending unit 1002 is further configured to: send configuration information to the terminal, where the configuration information is used to indicate the configured resource.

In an implementation, the sending unit 1002 is further configured to: send first scheduling information to the terminal, where the first scheduling information is used to adjust the configured resource obtained by the terminal from the network device.

In an implementation, the first scheduling information is scrambled by using a group identifier.

In an implementation, the first scheduling information is used to adjust time domain position information of the configured resource.

In an implementation, the sending unit is further configured to: send second scheduling information to the terminal, where the second scheduling information is used to indicate information about the configured resource, and the information about the configured resource is used by the terminal to determine a resource of the terminal based on a corresponding resource offset.

In an implementation, the resource offset corresponding to the terminal is indicated by the network device in advance.

In an implementation, the second scheduling information is scrambled by using a group identifier, and the terminal is in a device group identified by the group identifier.

The communication apparatus provided in this embodiment of this application may perform an action on a network device side in the foregoing method embodiments. Implementation principles and technical effects of the communication apparatus are similar to those in the method embodiments, and details are not described herein again.

Figure 11:
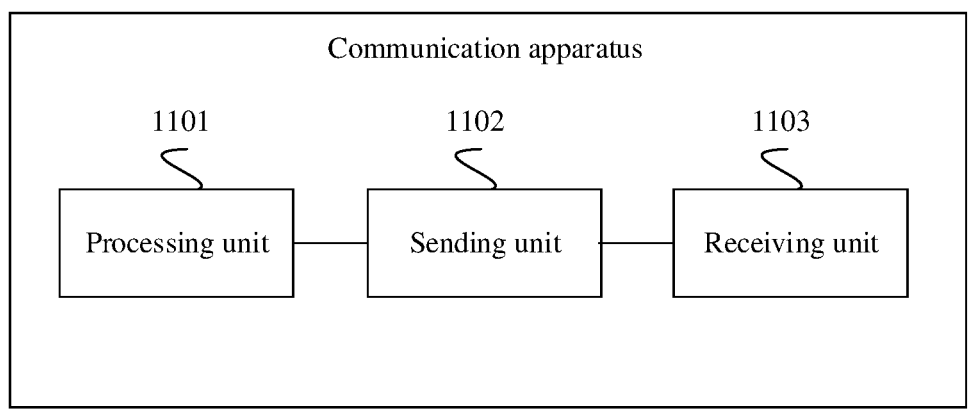
FIG. 11 is a schematic structural diagram of yet another communication apparatus according to an embodiment of this application.

FIG. 11 is a schematic structural diagram of yet another communication apparatus according to an embodiment of this application. The communication apparatus may include a unit (or means) configured to implement each step performed by the network device in any one of the foregoing methods. The communication apparatus may be a network device, or may be a chip used in a network device. As shown in FIG. 11, the communication apparatus may include a processing unit 1101, a sending unit 1102, and a receiving unit 1103.

The processing unit 1101 is configured to send indication information to a terminal through the sending unit 1102, where the indication information is used to indicate that a first resource is used to send a MAC CE.

The receiving unit 1103 is configured to receive the MAC CE sent by the terminal on the first resource.

In an implementation, the MAC CE includes a BSR.

In an implementation, the indication information is used to indicate that the first resource is used to send the BSR.

In an implementation, the first resource is a periodic transmission resource.

In an implementation, the receiving unit 1103 is specifically configured to: receive a MAC CE that is sent by the terminal on the first resource and that corresponds to a first logical channel or a first logical channel group.

In an implementation, the first logical channel or the first logical channel group is indicated by the network device in advance.

In an implementation, the indication information is further used to indicate the first logical channel or the first logical channel group.

In an implementation, the first logical channel is a logical channel whose priority is greater than or equal to a preset threshold, and the first logical channel group is a logical channel group whose priority is greater than or equal to a preset threshold.

In an implementation, the MAC CE includes a BSR. The receiving unit 1103 is specifically configured to: when a data buffer size of the first logical channel or the first logical channel group is greater than 0, receive the BSR sent by the terminal on the first resource.

The communication apparatus provided in this embodiment of this application may perform an action on a network device side in the foregoing method embodiments. Implementation principles and technical effects of the communication apparatus are similar to those in the method embodiments, and details are not described herein again.

It should be understood that division of the foregoing apparatus into units is merely division into logical functions. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program, and a processing element of the apparatus invokes the program to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

In an example, a unit in any one of the foregoing apparatuses may be one or more integrated circuits configured to implement the foregoing method, for example, one or more application-specific integrated circuits (ASIC), one or more microprocessors (DSP), or one or more field programmable gate arrays (FPGA), or a combination of at least two of these integrated circuit forms. For another example, when the unit in the apparatus may be implemented by a program invoked by the processing element, the processing element may be a general purpose processor, for example, a central processing unit (CPU), or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in the form of the chip, the sending unit is an interface circuit that is of the chip and that is configured to send a signal to another chip or apparatus.

Figure 12:
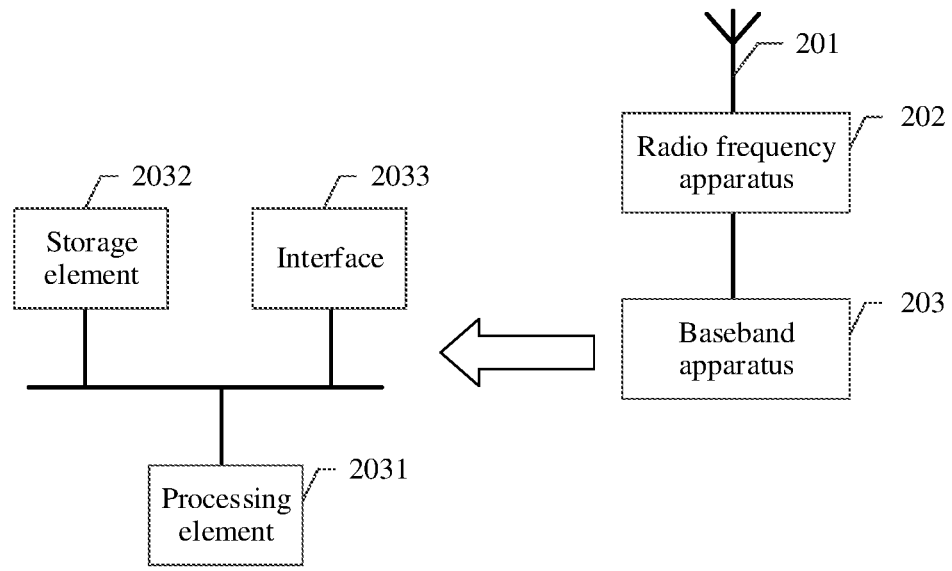
FIG. 12 is a schematic structural diagram of a communication apparatus being a network device according to an embodiment of this application.

FIG. 12 is a schematic structural diagram of a communication apparatus being a network device according to an embodiment of this application. The network device is configured to implement operations of the network device in the foregoing embodiments. As shown in FIG. 12, the network device includes an antenna 201, a radio frequency apparatus 202, and a baseband apparatus 203. The antenna 201 is connected to the radio frequency apparatus 202. In an uplink direction, the radio frequency apparatus 202 receives, through the antenna 201, information sent by a terminal, and sends, to the baseband apparatus 203 for processing, the information sent by the terminal. In a downlink direction, the baseband apparatus 203 processes information of the terminal, and sends the information to the radio frequency apparatus 202. The radio frequency apparatus 202 processes the information of the terminal, and then sends the processed information to the terminal through the antenna 201.

The baseband apparatus 203 may include one or more processing elements 2031, for example, include one main control CPU and another integrated circuit. In addition, the baseband apparatus 203 may further include a storage element 2032 and an interface 2033. The storage element 2032 is configured to store a program and data. The interface 2033 is configured to exchange information with the radio frequency apparatus 202, and the interface is, for example, a common public radio interface (CPRI). The foregoing apparatus used for the network device may be located in the baseband apparatus 203. For example, the foregoing apparatus used for the network device may be a chip on the baseband apparatus 203. The chip includes at least one processing element and interface circuit. The processing element is configured to perform the steps in any one of the methods performed by the network device. The interface circuit is configured to communicate with another apparatus. In an implementation, units of the network device that implement the steps in the foregoing methods may be implemented by a program invoked by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing methods may be configured as one or more processing elements. The processing elements are disposed on the baseband apparatus. The processing element herein may be an integrated circuit, for example, one or more ASICs, one or more DSPs, one or more FPGAs, or a combination of these types of integrated circuits. The integrated circuits may be integrated together to form a chip.

Units of the network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by the program invoked by the processing element, and functions of some units may be implemented by the integrated circuit.

It can be learned that the foregoing apparatus used for the network device may include at least one processing element and interface circuit. The at least one processing element is configured to perform any one of the methods performed by the network device that are provided in the foregoing method embodiments. The processing element may perform some or all steps performed by the network device, in a first manner, to be specific, by invoking the program stored in the storage element; or may perform some or all steps performed by the network device, in a second manner, to be specific, by using a hardware integrated logic circuit in the processing element in combination with instructions; or may certainly perform, by combining the first manner and the second manner, some or all steps performed by the network device.

As described above, the processing element herein may be a general purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms.

The storage element may be a memory, or may be a general name of a plurality of storage elements.

Figure 13:
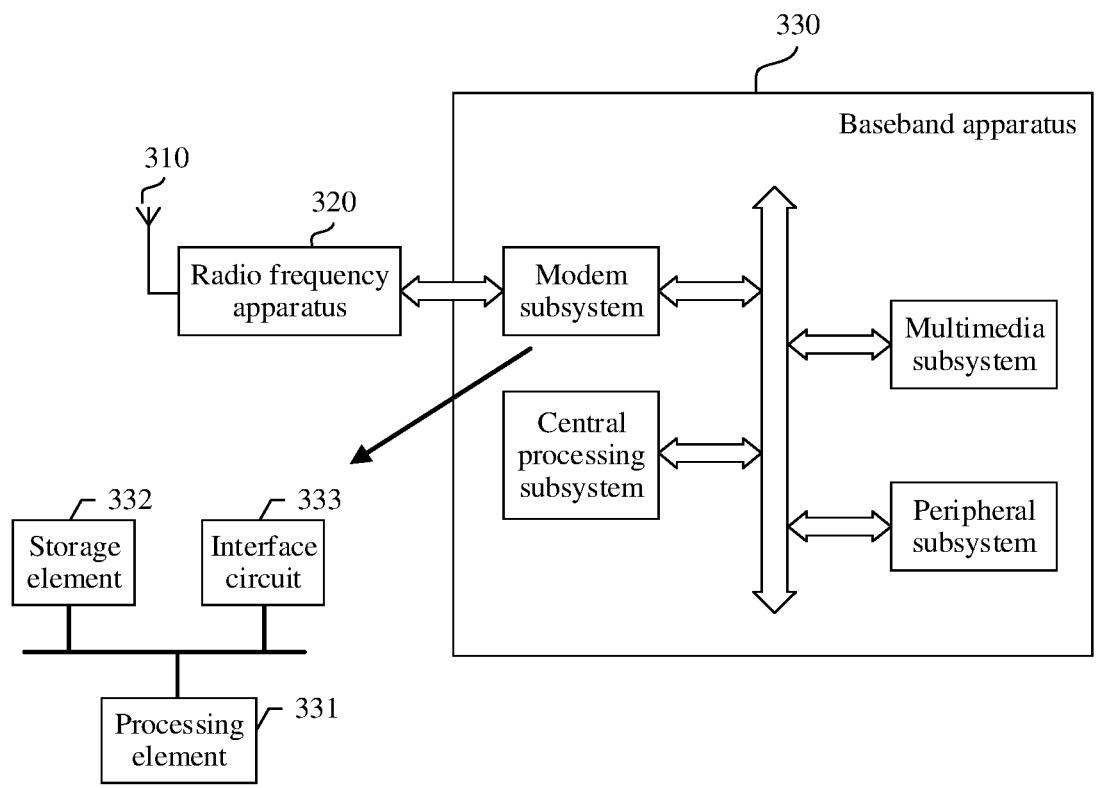
FIG. 13 is a schematic structural diagram of a communication apparatus being a terminal according to an embodiment of this application.

FIG. 13 is a schematic structural diagram of a communication apparatus being a terminal according to an embodiment of this application. The terminal may be the terminal in the foregoing embodiments and is configured to implement operations of the terminal in the foregoing embodiments. As shown in FIG. 15, the terminal includes an antenna 310, a radio frequency part 320, and a signal processing part 330. The antenna 310 is connected to the radio frequency part 320. In a downlink direction, the radio frequency part 320 receives, through the antenna 310, information sent by a network device, and sends, to the signal processing part 330 for processing, the information sent by the network device. In an uplink direction, the signal processing part 330 processes information of the terminal, and sends the information to the radio frequency part 320. The radio frequency part 320 processes the information of the terminal, and then sends the processed information to the network device through the antenna 310.

The signal processing part 330 may include a modem subsystem, configured to process data at each communication protocol layer. The signal processing part 330 may further include a central processing subsystem, configured to process an operating system and an application layer of the terminal. In addition, the signal processing part 330 may further include another subsystem, for example, a multimedia subsystem, or a peripheral subsystem. The multimedia subsystem is configured to control a camera, a screen display, or the like of the terminal. The peripheral subsystem is configured to implement a connection to another device. The modem subsystem may be a separately disposed chip. Optionally, the foregoing apparatus used for the terminal may be located in the modem subsystem.

The modem subsystem may include one or more processing elements 331, for example, include one main control CPU and another integrated circuit. In addition, the modem subsystem may further include a storage element 332 and an interface circuit 333. The storage element 332 is configured to store data and a program. However, a program used to perform the methods performed by the terminal in the foregoing methods may not be stored in the storage element 332, but is stored in a memory outside the modem subsystem, and is loaded by the modem subsystem to use. The interface circuit 333 is configured to communicate with another subsystem. The foregoing apparatus used for the terminal may be located in the modem subsystem. The modem subsystem may be implemented by using a chip. The chip includes at least one processing element and interface circuit. The processing element is configured to perform the steps in any one of the methods performed by the terminal. The interface circuit is configured to communicate with another apparatus. In an implementation, units of the terminal that implement the steps in the foregoing methods may be implemented by a program invoked by a processing element. For example, the apparatus used for the terminal includes a processing element and a storage element. The processing element invokes a program stored in the storage element, to perform the methods performed by the terminal in the foregoing method embodiments. The storage element may be a storage element located on a same chip as the processing element, namely, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiments.

In still another implementation, units of the terminal that implement the steps in the foregoing methods may be configured as one or more processing elements. The processing elements are disposed on the modem subsystem. The processing element herein may be an integrated circuit, for example, one or more ASICs, one or more DSPs, one or more FPGAs, or a combination of these types of integrated circuits. The integrated circuits may be integrated together to form a chip.

Units of the terminal that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the program invoked by the processing element, and functions of some units may be implemented by the integrated circuit.

It can be learned that the foregoing apparatus used for the terminal may include at least one processing element and interface circuit. The at least one processing element is configured to perform any one of the methods performed by the terminal that are provided in the foregoing method embodiments. The processing element may perform some or all steps performed by the terminal, in a first manner, to be specific, by invoking the program stored in the storage element; or may perform some or all steps performed by the terminal, in a second manner, to be specific, by using a hardware integrated logic circuit in the processing element in combination with instructions; or may certainly perform, by combining the first manner and the second manner, some or all steps performed by the terminal.

As described above, the processing element herein may be a general purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms.

The storage element may be a memory, or may be a general name of a plurality of storage elements.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The term "a plurality of" in this application refers to two or more than two. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between associated objects. In a formula, the character "/" indicates a "division" relationship between associated objects.

It may be understood that various numbers in the embodiments of this application are merely used for differentiation for ease of description, and are not used to limit the scope of the embodiments of this application.

It may be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application.

What is claimed is:

1. A method, comprising:
    receiving, by an access network device, assistance information from a core network device, wherein the assistance information comprises traffic pattern information of a quality of service (QoS) flow, and wherein the traffic pattern information comprises one or more of the following information: a start time of the QoS flow or a periodicity of the QoS flow;
    determining, by the access network device based on the traffic pattern information, to adjust a configured resource of a terminal; and
    sending, by the access network device, scheduling information to the terminal, wherein the scheduling information adjusts the configured resource of the terminal.

2. The method according to claim 1, wherein the core network device is an access and mobility management function (AMF) device.

3. The method according to claim 1, wherein the core network device is a session management function device.

4. The method according to claim 1, wherein the scheduling information adjusts a time domain position of the configured resource.

5. An apparatus, comprising:
    a processor; and
    a non-transitory computer-readable storage medium coupled to the processor and storing programming instructions, the programming instructions, when executed by the processor, causing the apparatus to:
        receive assistance information from a core network device, wherein the assistance information comprises traffic pattern information of a quality of service (QoS) flow, wherein the apparatus is an access network device or is applied to an access network device, and wherein the traffic pattern information comprises one or more of the following information: a start time of the QoS flow or a periodicity of the QoS flow;
        determine, based on the traffic pattern information, to adjust a configured resource of a terminal; and
        send scheduling information to the terminal, wherein the scheduling information adjusts the configured resource of the terminal.

6. The apparatus according to claim 5, wherein the core network device is an access and mobility management function (AMF) device.

7. The apparatus according to claim 5, wherein the core network device is a session management function device.

8. The apparatus according to claim 5, wherein the scheduling information adjusts a time domain position of the configured resource.

9. A communications system, comprising:
    an access network device; and
    a core network device, configured to send assistance information to the access network device, wherein the assistance information comprises traffic pattern information of a quality of service (QoS) flow, and wherein the traffic pattern information comprises one or more of the following information: a start time of the QoS flow or a periodicity of the QoS flow;
    wherein the access network device is configured to:
        receive the assistance information from the core network device;
        determine, based on the traffic pattern information, to adjust a configured resource of a terminal; and
        send scheduling information to the terminal, wherein the scheduling information adjusts the configured resource of the terminal.

10. The communications system according to claim 9, wherein the core network device is an access and mobility management function (AMF) device.

11. The communications system according to claim 9, wherein the core network device is a session management function device.

12. The communications system according to claim 9, wherein the scheduling information adjusts a time domain position of the configured resource.

13. The method according to claim 1, wherein sending, by the access network device, scheduling information to the terminal, the scheduling information adjusting the configured resource of the terminal, comprises:
    sending, by the access network device, one piece of downlink control information to a plurality of terminals, wherein the one piece of downlink control information comprises the scheduling information, and the scheduling information adjusts a configured resource of each terminal of the plurality of terminals; and wherein the method further comprises:
  receiving, by the access network device, an uplink transmission from each terminal of the plurality of terminals that is sent using the respective adjusted configured resource.

14. The method according to claim 13, wherein the one piece of downlink control information comprises a group identifier corresponding to the plurality of terminals.

15. The method according to claim 1, further comprising:
  receiving, by the access network device, an uplink transmission from the terminal that is sent using the adjusted configured resource.

16. The apparatus according to claim 5, wherein the programming instructions, when executed by the processor, further cause the apparatus to:
  receive an uplink transmission from the terminal that is sent using the adjusted configured resource.

17. The apparatus according to claim 5, wherein sending scheduling information to the terminal, the scheduling information adjusting the configured resource of the terminal, comprises:
  sending one piece of downlink control information to a plurality of terminals, wherein the one piece of downlink control information comprises the scheduling information, and the scheduling information adjusts a configured resource of each terminal of the plurality of terminals; and
  wherein the programming instructions, when executed by the processor, further cause the apparatus to:
    receive an uplink transmission from each terminal of the plurality of terminals that is sent using the respective adjusted configured resource.

18. The apparatus according to claim 17, wherein the one piece of downlink control information comprises a group identifier corresponding to the plurality of terminals.

19. The communications system according to claim 9, wherein the access network device is further configured to:
  receive an uplink transmission from the terminal that is sent using the adjusted configured resource.

20. The communications system according to claim 9, wherein sending scheduling information to the terminal, the scheduling information adjusting the configured resource of the terminal, comprises:
  sending one piece of downlink control information to a plurality of terminals, wherein the one piece of downlink control information comprises the scheduling information, and the scheduling information adjusts a configured resource of each terminal of the plurality of terminals.

* * * * *